(12) United States Patent
Uchiumi et al.

(10) Patent No.: US 10,661,848 B2
(45) Date of Patent: May 26, 2020

(54) SEAT DEVICE

(71) Applicant: TS TECH CO., LTD., Asaka-shi, Saitama (JP)

(72) Inventors: Goro Uchiumi, Tochigi (JP); Tatsuro Ogawa, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 93 days.

(21) Appl. No.: 15/813,638

(22) Filed: Nov. 15, 2017

(65) Prior Publication Data

US 2018/0141604 A1 May 24, 2018

(30) Foreign Application Priority Data

Nov. 18, 2016 (JP) .................................. 2016-225450
Sep. 5, 2017 (JP) .................................. 2017-170608
Oct. 11, 2017 (JP) .................................. 2017-197954

(51) Int. Cl.
*B62J 1/06* (2006.01)
*B62J 1/12* (2006.01)
*B62J 1/10* (2006.01)
*B62J 1/08* (2006.01)

(52) U.S. Cl.
CPC ................ *B62J 1/065* (2013.01); *B62J 1/12* (2013.01); *B62J 1/10* (2013.01); *B62J 2001/085* (2013.01)

(58) Field of Classification Search
CPC ....... B62J 1/065; B62J 1/18; B62J 1/06; B62J 1/12

See application file for complete search history.

(56) References Cited

U.S. PATENT DOCUMENTS

| 4,765,432 | A | * | 8/1988 | Odom | ........................ | B62J 1/12 |
| | | | | | | 180/227 |
| 5,489,139 | A | * | 2/1996 | McFarland | ................ | B62J 1/04 |
| | | | | | | 248/586 |
| 5,702,093 | A | * | 12/1997 | Liao | ........................ | B62J 1/04 |
| | | | | | | 267/132 |
| 10,086,893 | B2 | * | 10/2018 | Ogawa | ........................ | B62J 1/28 |
| 2006/0048987 | A1 | * | 3/2006 | Karube | ........................ | B62J 1/12 |
| | | | | | | 180/210 |

(Continued)

FOREIGN PATENT DOCUMENTS

| EP | 1437293 A2 | * | 7/2004 | ................ | B62J 1/12 |
| FR | 897427 A | * | 3/1945 | .............. | B62J 1/065 |

(Continued)

*Primary Examiner* — Timothy J Brindley
(74) *Attorney, Agent, or Firm* — Faegre Drinker Biddle & Reath LLP

(57) ABSTRACT

A position adjusting device, which adjusts the position of a seat in a height direction, includes a seat support plate that supports the seat and a rotary link that rotates integrally with the seat support plate when the position of the seat is adjusted. The seat support plate includes a front portion that is positioned directly under an occupant's buttocks when the occupant is seated in the seat, and a rear portion that is positioned on the rear side of the front portion. The rotary link includes a front link and a rear link that are provided at positions different from each other in a front to back direction. The front link and the rear link are mounted on the front portion, and the width of the front portion is smaller than the width of the rear portion.

12 Claims, 17 Drawing Sheets

(56) References Cited

U.S. PATENT DOCUMENTS

| | | | |
|---|---|---|---|
| 2010/0207416 A1* | 8/2010 | Inoue | B60N 2/646 296/63 |
| 2012/0126589 A1* | 5/2012 | Kawatani | B62J 1/12 297/195.12 |
| 2015/0175229 A1* | 6/2015 | Chiba | B62J 1/12 297/452.18 |
| 2016/0090137 A1* | 3/2016 | Mori | B62J 1/28 |

FOREIGN PATENT DOCUMENTS

| | | | | |
|---|---|---|---|---|
| FR | 1353452 A | * | 2/1964 | B62J 1/04 |
| FR | 1428565 A | * | 2/1966 | B62J 1/065 |
| JP | 2004210212 A | * | 7/2004 | B62J 1/12 |
| JP | 4737548 B2 | | 8/2011 | |
| WO | WO-2014179815 A1 | * | 11/2014 | B62J 1/065 |

\* cited by examiner

SEAT DEVICE

CROSS REFERENCE TO RELATED APPLICATIONS

This application is based upon and claims the priority benefit of Japanese Patent Application No. JP 2017-197954, filed Oct. 11, 2017, Japanese Patent Application No. JP 2017-170608, filed Sep. 5, 2017, and Japanese Patent Application No. JP 2016-225450, filed Nov. 18, 2016, the contents being incorporated herein by reference.

BACKGROUND

The present disclosure relates to a seat device that includes a saddle-riding type seat configured to receive a seated occupant of a conveyance, and particularly relates to a seat device that can adjust the position of a seat in a height direction of the conveyance.

A structure in which a saddle-riding type seat is movable in a conveyance, such as a motorcycle, has been already known. A motorcycle (hereinafter, referred to as a motorcycle in the related art) disclosed in the specification of, for example, Japanese Patent Publication JP4737548 B has a drive mechanism (front portion-drive mechanism) that moves a front portion of a seat up and down and a drive mechanism (rear portion-drive mechanism) that moves a rear portion of the seat up and down. Each of these drive mechanisms includes a drive motor and links that interlock with the movement of the drive motor. Further, the drive motor is rotated and the links are rotated while interlocking with the rotation of the drive motor, so that the height of each portion of the seat is changed.

Furthermore, in the motorcycle in the related art, the drive mechanisms are provided for the front portion and the rear portion of the seat, respectively. For this reason, the heights of the front and rear portions of the seat can be adjusted independently of each other. As a result, the outer shape of the seat can be freely changed three-dimensionally.

Incidentally, the structure in which the seat is movable has the same devices as the drive mechanisms (the front portion-drive mechanism and the rear portion-drive mechanism) of the motorcycle in the related art, that is, devices that adjust the position of the seat. It is preferable that the devices are made more compact and can efficiently adjust the position of the seat in a state in which an occupant of a conveyance is seated in the seat.

SUMMARY

The present disclosure has been made in consideration of the above-mentioned problem, and various embodiments of the disclosure include a seat device in which a position adjusting device provided to adjust the position of a seat in a height direction of a conveyance is made more compact and the position of the seat can be more efficiently adjusted.

The problem is solved by an embodiment of a seat device according to the present disclosure. The seat device according to an embodiment includes a saddle-riding type seat configured to support a seated occupant of a conveyance and a position adjusting device that adjusts the position of the seat in a height direction of the conveyance. The position adjusting device includes a plate-shaped support member that supports the seat in a state in which the seat is placed on the plate-shaped support member, and a rotary link that rotates integrally with the support member when the position of the seat is adjusted; the support member includes a front portion that is positioned directly under the occupant's buttocks when the occupant is seated in the seat, and a rear portion that is positioned on a rear side of the front portion in a front to back direction of the conveyance; the rotary link includes a front link and a rear link that are provided at positions different from each other in the front to back direction; the front and rear links are mounted on the front portion; and a width of the front portion in a width direction of the conveyance is smaller than a width of the rear portion in the width direction.

In the seat device having the above-mentioned structure, the front and rear links are assembled with the front portion of the plate-shaped support member supporting the seat in a state in which the seat is placed on the plate-shaped support member, in an embodiment. Further, the front portion is positioned directly under the occupant's buttocks when the occupant is seated in the seat. Accordingly, when the position of the seat is adjusted, the front portion on which the occupant's buttocks are placed is moved while interlocking with the rotation operation of the rotary link. As a result, the position of the seat is more efficiently (smoothly) adjusted. Furthermore, the width of the front portion in the width direction of the conveyance is smaller than the width of the rear portion of the plate-shaped member. Accordingly, a space around the front portion of the support member on which the rotary link is mounted can be saved (more compact).

Further, in an embodiment of the seat device, the seat may include a bottom plate forming a bottom portion, the bottom plate may include a claw-shaped portion that extends in a shape of a claw and two portions to be fixed that are to be fixed to the support member, a front engagement portion, which is engaged with the claw-shaped portion, may be provided at a front end portion of the support member, and two fixing portions, which are formed to fix the portions to be fixed, may be provided at a rear end portion of the support member. In this structure, the claw-shaped portion and the two portions to be fixed, which are formed on the bottom plate of the seat, are fixed to the fixing portions of the support member, respectively. Accordingly, the seat can be fixed to the support member at fewer fixing portions.

Furthermore, more preferably, the portions to be fixed may be fixed to the respective fixing portions through elastic members that suppress transmission of vibration to the seat from a vehicle body of the conveyance, in an embodiment. In this structure, the portions to be fixed, which are provided on the bottom plate of the seat, are fixed to the fixing portions of the support member through the elastic members. Accordingly, the transmission of vibration to the seat from the vehicle body of the conveyance can be suppressed during the travel of the conveyance, so that the ride quality of the seat can be improved.

Further, in an embodiment of the seat device, the seat may include a bottom plate forming a bottom portion, the bottom plate may include a plurality of extension portions that extend to protrude, and engagement portions, which are to be engaged with the extension portions and of which the number is the same as the number of the extension portions, may be formed on the support member at positions different from each other in the front to back direction. In this structure, the plurality of extension portions, which are formed on the bottom plate of the seat, are engaged with corresponding engagement portions of the plurality of engagement portions provided on the support member, respectively. Accordingly, when the seat is fixed to (assembled with) the support member, the seat can be positioned relative to the support member. As a result, the seat is appropriately fixed to the support member.

Furthermore, in an embodiment of the seat device, the seat may include a seating surface, a first end face, which is closer to the seating surface in the height direction, of the front portion may be a flat surface, and a second end face, which is closer to the seating surface in the height direction, of the rear portion may be an inclined surface that is inclined to approach the seating surface toward the rear side. In this structure, the upper surface (the surface closer to the seating surface) of the front portion is a flat surface. Accordingly, when an occupant is seated in the seat, the front portion appropriately receives the load of the occupant. In addition, since the upper surface (the surface closer to the seating surface) of the rear portion is an inclined surface that is inclined to be positioned on the upper side toward the rear side, the seating posture of the occupant can be stabilized.

Further, more preferably, the flat surface may be a flat surface to which a normal direction is the height direction, in an embodiment. In this structure, a surface (flat surface), which receives the load of the occupant, is formed of a flat surface to which a normal direction is the height direction of the conveyance. Accordingly, an effect of appropriately receiving the load of the occupant by the front portion can be more effectively exhibited.

Furthermore, in an embodiment of the seat device, the support member may include an adjacent portion that is adjacent to the front portion on a front side of the front portion in the front to back direction, and the adjacent portion may be inclined to approach the seating surface toward the front side in the front to back direction. In this structure, the adjacent portion, which is positioned on the front side of the front portion in the support member, is inclined to be positioned on the upper side toward the front side. Accordingly, the forward movement of the occupant, which is caused by inertia when the travel speed of the conveyance is reduced, can be suppressed by the adjacent portion.

Further, in an embodiment of the seat device, the position of the seat may be adjustable in a range from a first position to a second position, the second position may be a position that is more distant from a ground surface, on which the conveyance stands, than the first position in the height direction, and the degree of tilt of each of the front and rear links may be changed as the position of the seat is changed to the second position from the first position. In this structure, each of the front and rear links is rotated backward from a forward tilted state, so that the seat is moved to the second position from the first position. Accordingly, the position of the seat can be adjusted by a relatively simple structure.

Furthermore, more preferably, the second position may be a position present on a rear side of the first position in the front to back direction, in an embodiment. In this structure, the seat is moved obliquely backward when being moved to the second position from the first position. Since the seat is moved along such a movement path, a situation where the seat interferes with components positioned around the seat is easily avoided. Further, according to this structure, when the position of the seat is raised, the seat is easily moved in comparison with a structure that the seat is moved to a position directly above the seat.

Alternatively, in the front to back direction, the second position may be a position present on a front side of the first position in the front to back direction, in an embodiment. In this structure, the seat is moved obliquely forward when being moved to the second position from the first position. According to this structure, a space between a member (for example, a fuel tank) disposed obliquely above the seat and the seat can be narrowed, so that the appearance of the periphery of the seat device can be improved.

Further, in an embodiment of the seat device, the position adjusting device may be a device in which components of the position adjusting device including the support member and the rotary link are integrated as a unit, and may be detachably mounted on the vehicle body of the conveyance. In this structure, the components of the position adjusting device are integrated as a unit and are detachably mounted on the vehicle body of the conveyance. Accordingly, work for handling and replacing the position adjusting device, and the like are simpler.

According to an embodiment of the seat device of the present disclosure, the position of the seat is more efficiently adjusted. Further, a space around a portion on which the rotary link is mounted is saved. Furthermore, according to the seat device of an embodiment, the seat can be fixed to the support member at fewer fixing portions. Moreover, according to an embodiment of the seat device, the transmission of vibration to the seat from the vehicle body of the conveyance can be suppressed during the travel of the conveyance, so that the ride quality of the seat can be improved. Further, according to an embodiment of the seat device, when the seat is fixed to the support member, the seat can be positioned relative to the support member and can be appropriately fixed to the support member. Furthermore, according to an embodiment of the seat device, when an occupant is seated in the seat, the load of the occupant can be appropriately received and the seating posture of the occupant can be stabilized. Further, according to an embodiment of the seat device, a surface (flat surface), which receives the load of the occupant, is formed of a flat surface to which a normal direction is the height direction of the conveyance. Accordingly, an effect of appropriately receiving the load of the occupant by the front portion to stabilize the seating posture of the occupant can be more effectively exhibited. Furthermore, according to an embodiment of the seat device, the forward movement of the occupant, which is caused by inertia when the travel speed of the conveyance is reduced, can be suppressed. Further, according to an embodiment of the seat device, the position of the seat can be adjusted by using a relatively simple drive mechanism. Furthermore, according to an embodiment of the seat device, the seat is moved obliquely backward to the second position from the first position. Accordingly, a situation where the seat interferes with components positioned around the seat is easily avoided. Further, when the position of the seat is raised, the seat can be more easily moved in comparison with a structure that the seat is moved to a position directly above the seat. Moreover, according to an embodiment of the seat device, the seat is moved obliquely forward to the second position from the first position. Accordingly, since a space between the member, which is disposed obliquely above the seat, and the seat can be narrowed, the appearance of the periphery of the seat device is improved. Further, according to an embodiment of the seat device, components of the position adjusting device are integrated as a unit and the position adjusting device is detachably mounted on the vehicle body of the conveyance. Accordingly, work for handling and replacing the position adjusting device, and the like are simpler.

BRIEF DESCRIPTION OF THE DRAWINGS

Various embodiments of the invention are illustrated in the drawings, in which.

DETAILED DESCRIPTION

Various embodiments of the present disclosure are described below. The embodiments to be described below facilitate the understanding of the invention, but does not limit the invention. That is, the embodiments may be modified and improved without departing from the scope of the invention and the invention includes equivalents thereof.

A motorcycle is described as an example of a "conveyance" in the following embodiments. However, the invention is not limited thereto, and can be applied to a conveyance including a saddle-riding type seat.

In the following description, a "front to back direction" is the front to back direction of the conveyance and corresponds to the travel direction of the conveyance. Further, a "width direction" is the width direction of the conveyance, and corresponds to a right to left direction that is viewed from an occupant of the conveyance. Further, a "height direction" is the height direction of the conveyance and corresponds to a vertical direction in a state in which the conveyance stands up on the horizontal surface.

Furthermore, the direction, the position, and the like of each component or each device in the following description are the direction, the position, and the like of each component or each device in a state in which the conveyance stands up on the horizontal (ground) surface except for a case in which the direction, the position, and the like are particularly indicated.

Schematic Structure of Seat Device According to this Embodiment

First, the schematic structure of a seat device (hereinafter, referred to as a seat device 10) according to this embodiment is described with reference to FIGS. 1 and 2. For convenience of illustration, a device 20 to be described below is schematically illustrated in FIG. 1.

Figure 1:
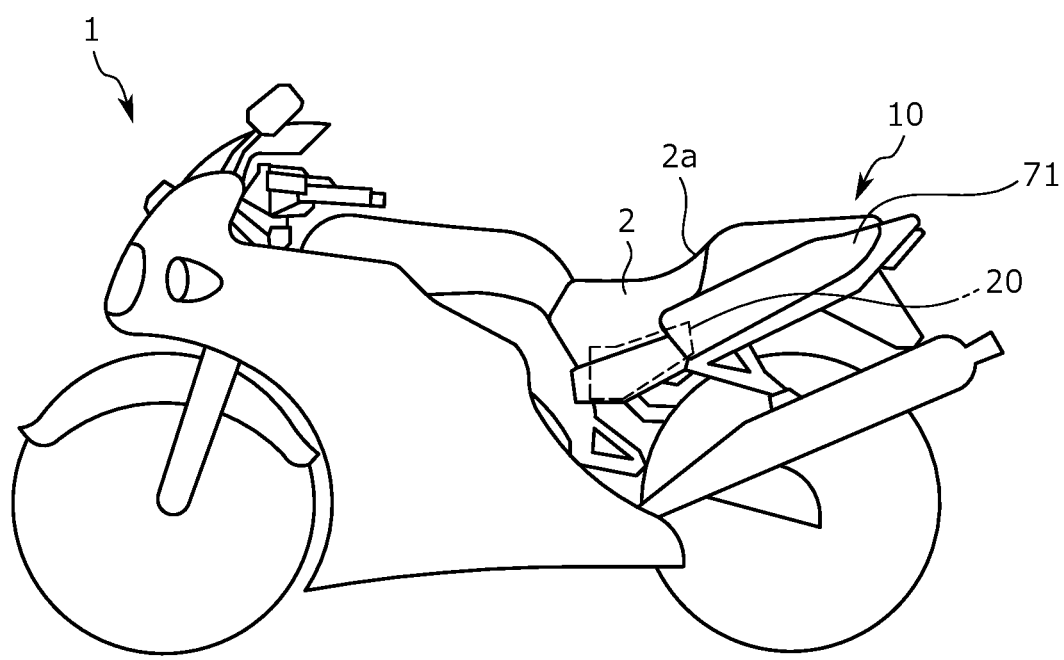
FIG. 1 is a side view illustrating a motorcycle on which a seat device according to an embodiment of the invention is mounted, according to an embodiment.

The seat device 10 is used in a state in which the seat device 10 is set in a motorcycle 1 as illustrated in FIG. 1. Here, the motorcycle 1 has a similar structure to a general motorcycle except that the motorcycle 1 includes a device 20, described below.

The seat device 10 includes a saddle-riding type seat 2 configured to support a seated occupant of a conveyance. The seat 2 is a seating seat having a general structure, and includes a seating surface 2a on the upper surface thereof. Further, the seat 2 is mounted on a vehicle body 3 to be detachable from the vehicle body 3 of the motorcycle 1. Specifically, mounting holes (not illustrated) are formed in the vehicle body 3 and the seat 2 is mounted on the vehicle body 3 by using the mounting holes and can be detached through the removal of bolts inserted into the mounting holes.

As illustrated in FIG. 1, the seat device 10 includes the device 20 provided at a position directly under the seat 2. The device 20 corresponds to a position adjusting device and is to adjust the seat 2 in the height direction. More specifically, in the seat device 10 according to this embodiment, the seat 2 can be moved in the height direction by the operation of the device 20. Accordingly, the height of the seat can be adjusted according to the occupant (the person seated in the seat)'s liking or can be adjusted according to the travel state of the motorcycle 1. Since the position of the seat can be moved up by such an operation in a case in which, for example, a relatively tall occupant is seated in the seat 2, compensation for a difference between the physique of the occupant and the physique of an average-sized occupant can be made.

Figure 2:
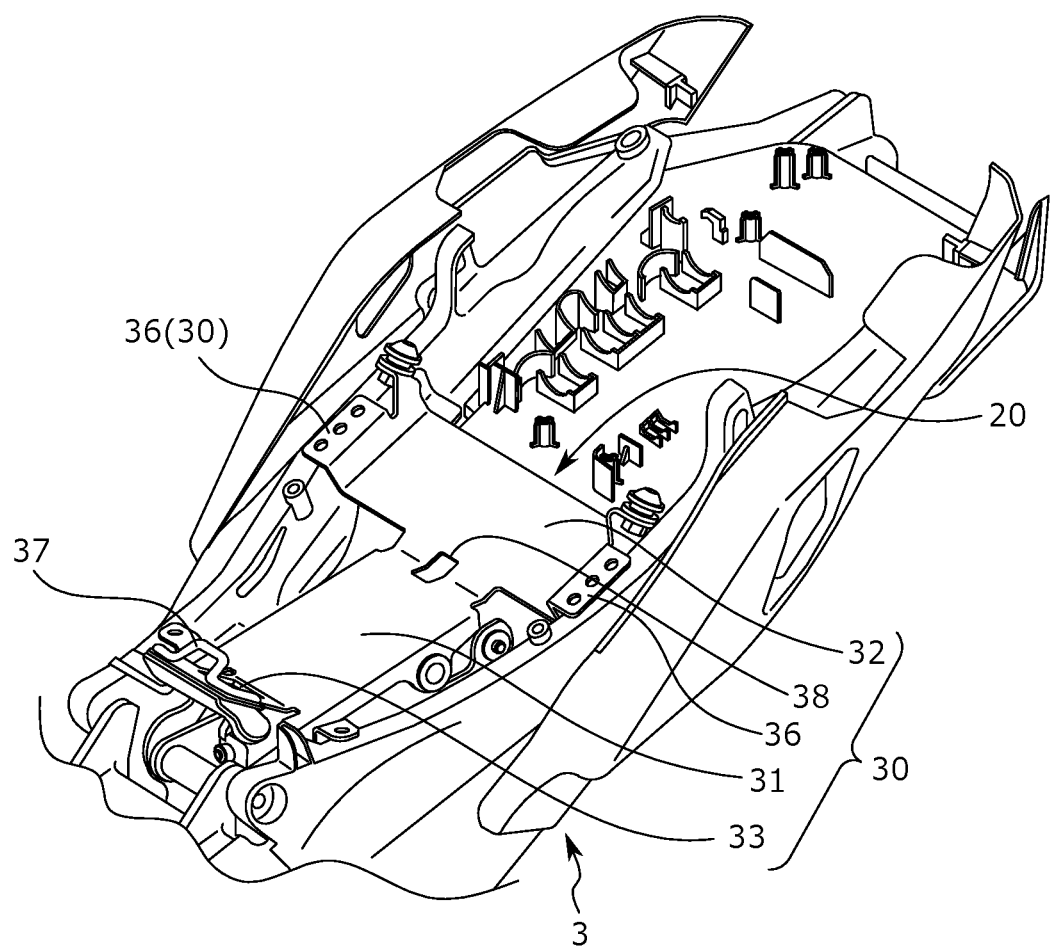
FIG. 2 is a partial, perspective view illustrating a position adjusting device mounted on a vehicle body, according to an embodiment.

As illustrated in FIG. 2, the device 20 is mounted on a predetermined portion of the vehicle body 3 of the motorcycle 1, for example, a portion of the vehicle body 3 on which the seat 2 is originally to be mounted. Further, the device 20 is mounted on the vehicle body 3 to be detachable from the vehicle body 3. More specifically, the device 20 is mounted on the vehicle body 3 using the mounting holes that are formed in the vehicle body 3 to mount the seat 2. Further, the device 20 is configured so that the seat 2 can be assembled with the device 20. Furthermore, in this embodiment, the seat 2 is mounted on the vehicle body 3 through the device 20. That is, since the seat 2 is assembled with the device 20 mounted on the vehicle body 3, the seat 2 is adapted to be mounted on the vehicle body 3.

A standard seat 2 can be assembled with the device 20 as a seat for a motorcycle. Accordingly, the device 20 can be mounted on (or can be retrofitted to) the standard motorcycle 1 that is a ready-made product. Further, since the device 20 is mounted on the motorcycle 1 that is a ready-made product, a function to adjust the position of the seat is given to the motorcycle 1.

Detailed Structure of Seat Device 10

Next, the mechanical structure of the seat device 10 is described in detail with reference to FIGS. 3 to 11. The seat device 10 includes the seat 2 and the device 20 as described above. The device 20 is configured to include components (for example, a seat support plate 30, rotary links 40, a link support plate 50, a base plate 52, and a motor device 60) illustrated in FIG. 3. In this embodiment, the components of the above-mentioned device 20 are joined to each other to form one unit. That is, the device 20 according to this embodiment is a device in which the components thereof are integrated as a unit. The structure of the device 20 is described in detail below.

Figure 5:
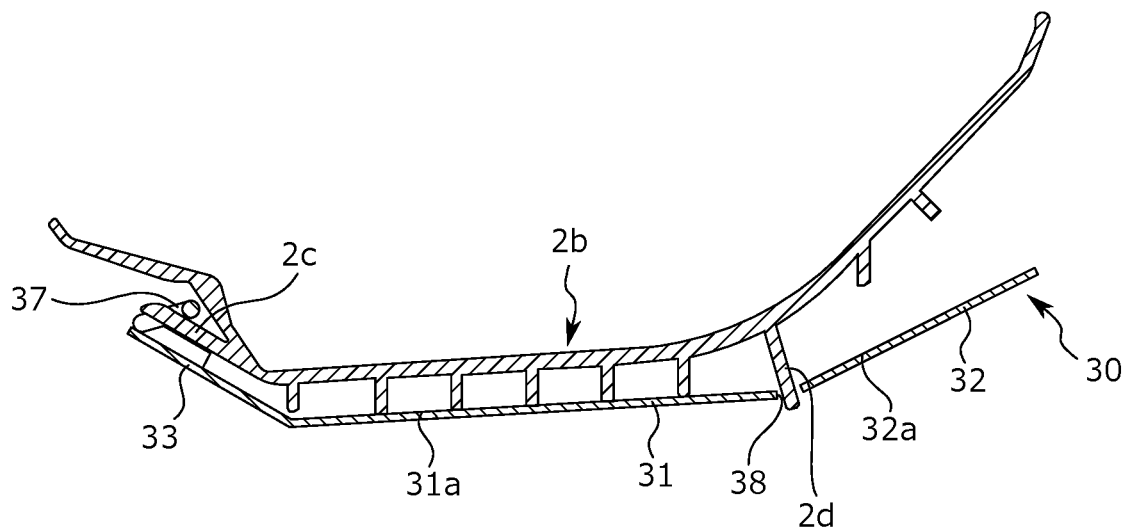
FIG. 5 is a side view illustrating a state in which a bottom plate of a seat is engaged with a support member, according to an embodiment.
Figure 7:
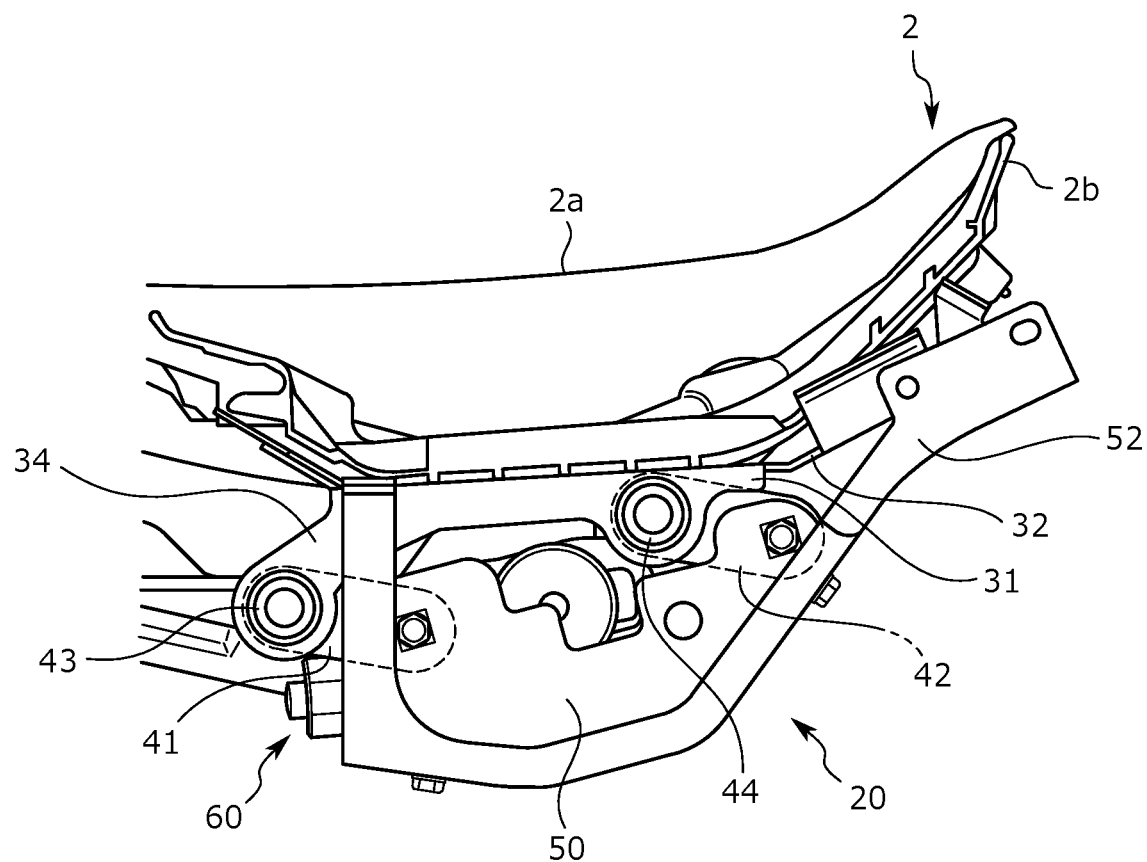
FIG. 7 is a partial side view illustrating the state of the position adjusting device when the position of the seat is a first position, according to an embodiment.

The seat 2 has a similar structure to a seat for a general motorcycle. Specifically, the seat 2 includes a bottom plate 2b that is illustrated in FIGS. 5 and 7, and the like. The bottom plate 2b forms the bottom portion of the seat 2, and a cushion material (not illustrated) is placed on the bottom plate 2b. Further, the cushion material placed on the bottom plate 2b is covered with a cover material, so that the seat 2 is completed. The seat 2 is divided into a front seat (front portion) and a rear seat (rear portion).

Furthermore, the bottom plate 2b includes a plurality of portions that are provided to mount the seat 2 on the device 20. The bottom plate 2b is described in detail with reference to FIGS. 5 and 6. As illustrated in FIG. 5, the bottom plate 2b includes two extension portions that extend to protrude outward. One extension portion is a claw-shaped portion 2c that extends forward from the front end of the bottom plate 2b in the shape of a claw. The other extension portion is a rear protrusion 2d that is provided slightly on the front side of the rear end of the bottom surface of the bottom plate 2b. The rear protrusion 2d extends downward, for example, and is inclined to be positioned on the lower side toward the rear side.

Figure 6:
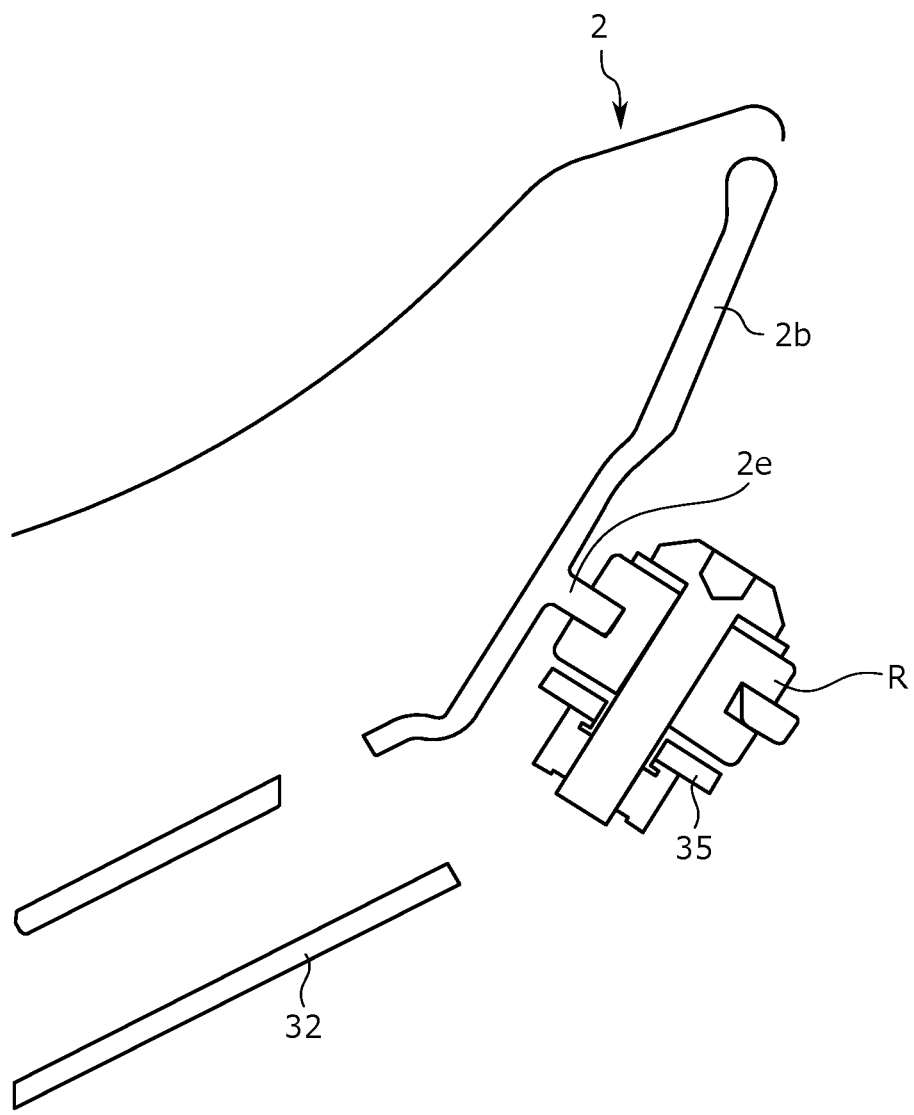
FIG. 6 is a partial side view illustrating a state in which the bottom plate of the seat is fixed to the support member, according to an embodiment.

In addition, portions 2e to be fixed illustrated in FIG. 6 are provided at the rear end portion of the bottom plate 2b. The portions 2e to be fixed are portions that are to be fixed to the seat support plate 30, when the seat 2 is mounted on the seat support plate 30 to be described below, and extend downward from the rear portion of the bottom surface of the bottom plate 2b. In this embodiment, the bottom plate 2b includes two portions 2e to be fixed. One portion 2e to be fixed is provided at one end portion of the bottom plate 2b in the width direction, and the other portion 2e to be fixed is provided at the other end portion of the bottom plate 2b in the width direction.

Figure 3:
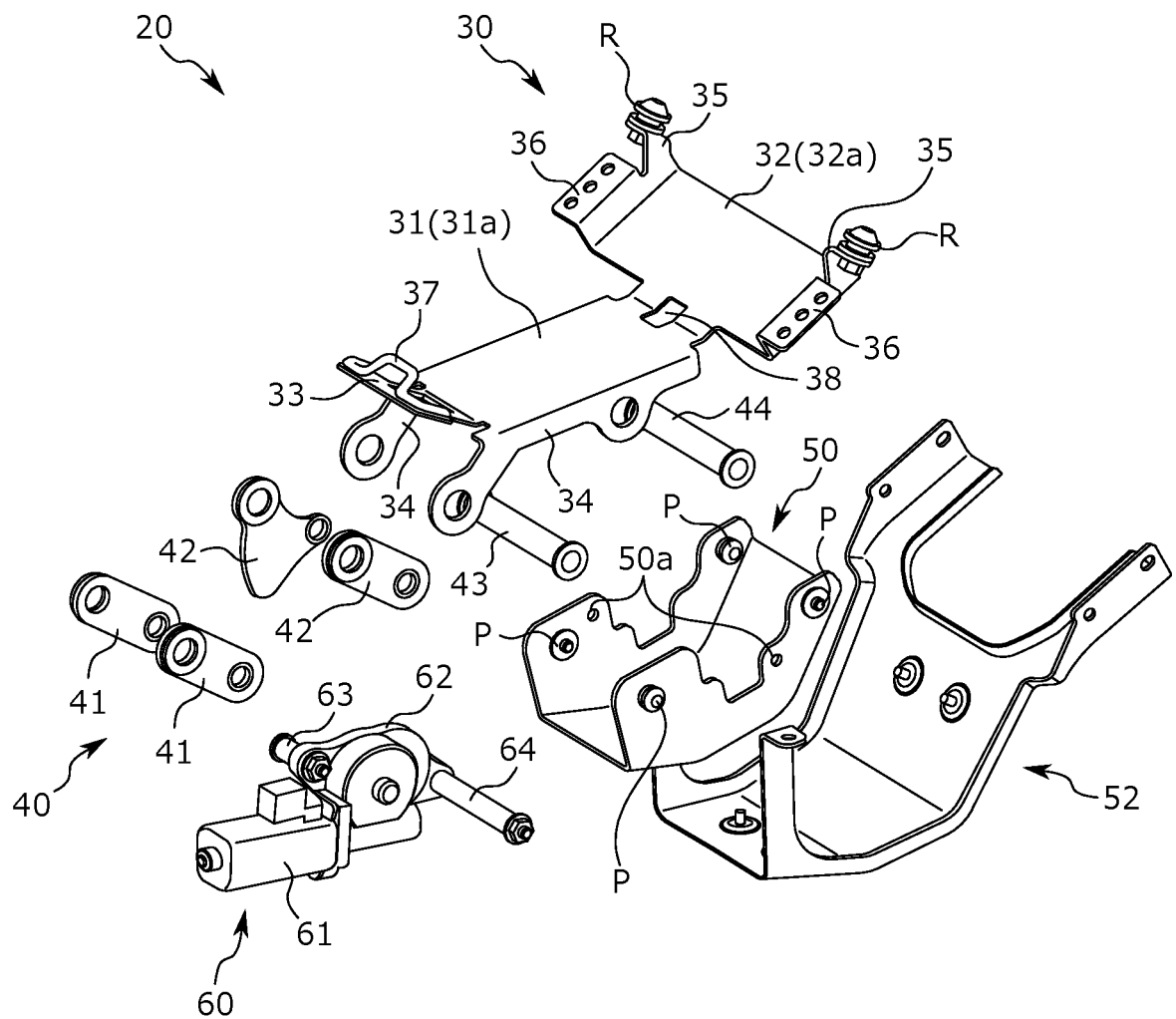
FIG. 3 is an exploded view of the position adjusting device, according to an embodiment.
Figure 4:
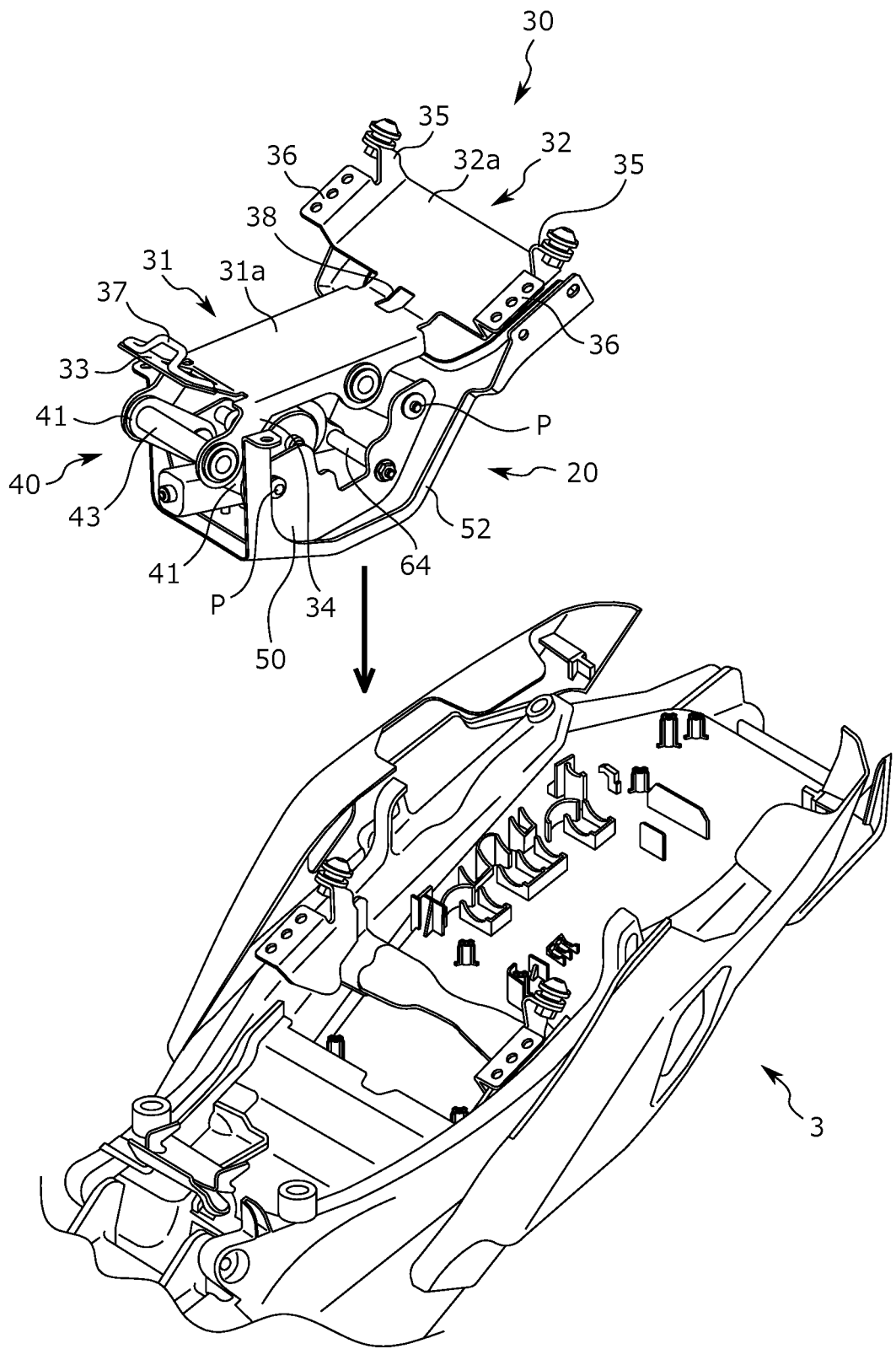
FIG. 4 is a perspective diagram illustrating a portion of the vehicle body on which the position adjusting device is mounted, according to an embodiment.

Next, the structure of the device 20 is described. As illustrated in FIG. 3, the device 20 includes the seat support plate 30, the rotary links 40, the link support plate 50, the base plate 52, and the motor device 60 as main components. The respective components are described below.

The seat support plate 30 corresponds to a plate-shaped support member, and is configured to support the seat 2 in a state in which the seat 2 is placed on the upper surface of the seat support plate 30. A metal plate, which is cut into a predetermined shape, is bent to have the shape illustrated in FIG. 3, so that the seat support plate 30 is formed.

The shape of the seat support plate 30 is described. The seat support plate 30 includes a front portion 31, a rear portion 32, an adjacent portion 33, link mounting portions 34, fixing portions 35, and L-shaped portions 36. The front portion 31 is a portion that is positioned at the front portion of the seat support plate 30. Further, when an occupant of the motorcycle 1 is seated in the seat 2, the front portion 31 is positioned directly under the occupant's buttocks. That is, the front portion 31 is a portion of the seat support plate 30 that receives the load (seating load) of the occupant.

More specifically, the front portion 31 supports the bottom plate 2b of the seat 2 on an upper surface 31a (a first end face close to the seating surface 2a of the seat 2 in the height direction) thereof. In this embodiment, the upper surface 31a of the front portion 31 is a flat surface, for example, a flat surface (that is, a horizontal surface) to which a normal direction is the height direction. According to this structure, when the occupant is seated in the seat 2, the front portion 31 appropriately receives the load of the occupant. The upper surface 31a of the front portion 31 is a flat surface in this embodiment, but is not limited thereto and may be, for example, a curved surface.

The rear portion 32 is a portion that is positioned on the rear side of the front portion 31 in the front to back direction. Further, the rear portion 32 is inclined to be positioned on the upper side (in other words, to approach the seating surface 2a of the seat 2) toward the rear side. Accordingly, an upper surface 32a (a second end face close to the seating surface 2a of the seat 2 in the height direction) of the rear portion 32 is formed of an inclined surface that is inclined to be positioned on the upper side toward the rear side. According to this structure, since the rear portion 32 can restrict the backward movement of the occupant's buttocks during the travel of the motorcycle 1, the seating posture of the occupant can be stabilized.

Further, the rear portion 32 is continuous with the front portion 31 in the front to back direction. Furthermore, the rear portion 32 is slightly wider than the front portion 31. Accordingly, the front portion 31 and the rear portion 32, which are continuous with each other, are formed substantially in a T shape in top view as illustrated in FIG. 3.

The adjacent portion 33 is a portion of the seat support plate 30 that is positioned on the foremost side. The adjacent portion 33 is adjacent to the front portion 31 on the front side of the front portion 31 in the front to back direction. Further, the adjacent portion 33 is inclined to be positioned on the upper side (in other words, to approach the seating surface 2a of the seat 2) toward the front side in the front to back direction. According to this structure, the forward movement of the occupant's buttocks, which is caused by inertia during the deceleration of the motorcycle 1 that is traveling, can be restricted by the adjacent portion 33.

The link mounting portions 34 are portions that are provided at both end portions of the seat support plate 30 in the width direction for the mounting of the rotary links 40, and are suspended from the positions of the ends of the front portion 31 in the width direction. The link mounting portions 34 extend in the front to back direction, and portions, which support rotating shafts of the rotary links 40, are provided at front end portions and rear end portions (for example, portions positioned slightly on the front side of the rear end) of the link mounting portions 34.

The fixing portions 35 are portions that are formed to fix the portions 2e to be fixed provided on the bottom plate 2b of the seat 2, and are provided at a rear end portion (for example, the position of the rear end of the rear portion 32) of the seat support plate 30. In this embodiment, a pair of (two) fixing portions 35 is provided at positions that are separated from each other in the width direction. The respective fixing portions 35 are provided at both end portions of the rear portion 32 in the width direction. The fixing portions 35 is described in detail below.

The L-shaped portions 36 are portions that are laterally bent in an L shape when viewed from a front view, and are provided at the rear end portion (rear portion) of the seat support plate 30 at positions on the front side of the fixing portions 35. In this embodiment, a pair of (two) L-shaped portions 36 is provided at positions that are separated from each other in the width direction. The respective L-shaped portions 36 are provided at both end portions of the rear portion 32 in the width direction. Further, the respective L-shaped portions 36 support side edge portions of the rear end portion of the seat support plate 30 by the upper end faces thereof.

The seat support plate 30 having been described above supports the seat 2 at a position under the seat 2. Further, the rotary links 40 are assembled with the link mounting portions 34 that are provided at both the end portions of the seat support plate 30 in the width direction. In more detail, the link mounting portions 34 are provided at both end portions of the front portion 31 in the width direction. Furthermore, the width of the front portion 31 is smaller than the width of the rear portion 32. That is, the size of the front portion 31 of the seat support plate 30 on which the rotary links 40 are mounted is smaller than the size of the rear portion 32. As a result, in this embodiment, a space around the front portion 31 on which the rotary links 40 are mounted is saved (more compact).

Further, the seat support plate 30 includes a plurality of portions that are formed to support the seat 2. In more detail, the bottom plate 2b includes the two extension portions (specifically, the claw-shaped portion 2c and the rear protrusion 2d) as described above. Engagement portions, which are to be engaged with the extension portions and of which the number is the same as the number of the extension portions, are formed at the seat support plate 30. That is, two engagement portions are formed at the seat support plate 30 in this embodiment. Furthermore, the two engagement portions are formed at positions that are different from each other in the front to back direction.

Specifically, one engagement portion is a front engagement portion 37 illustrated in FIG. 3. The front engagement portion 37 is formed of a wire member, and is mounted on the front end portion of the upper surface of the adjacent portion 33. Specifically, the wire member, which forms the front engagement portion 37, is bent in the shape of a rectangular wave, and a portion of the wire member, which is positioned at the middle portion of the wire member in the width direction, is displaced slightly above the upper surface of the adjacent portion 33 as illustrated in FIG. 3. When the seat 2 is fixed to the seat support plate 30, the front engagement portion 37 is engaged with the claw-shaped portion 2c. Specifically, a tip portion of the claw-shaped portion 2c is inserted into a gap between the portion of the front engagement portion 37, which floats from the upper surface of the adjacent portion 33, and the adjacent portion 33 as illustrated in FIG. 5, so that the front engagement portion 37 is engaged with the claw-shaped portion 2c.

The other engagement portion is a rear engagement portion 38 illustrated in FIG. 3. The rear engagement portion 38 is formed of a rectangular hole that is formed at a boundary portion of the seat support plate 30 between the front portion 31 and the rear portion 32. Further, when the seat 2 is fixed to the seat support plate 30, the rear engagement portion 38 is engaged with the rear protrusion 2d. Specifically, a tip portion of the rear protrusion 2d is inserted into the rectangular hole forming the rear engagement portion 38 as illustrated in FIG. 5, so that the rear engagement portion 38 is engaged with the rear protrusion 2d.

As described above, in this embodiment, the two engagement portions are engaged with the corresponding extension portions of the bottom plate 2b when the seat 2 is fixed to the seat support plate 30. Accordingly, the seat 2 can be positioned relative to the seat support plate 30 and the seat 2 can then be fixed to the seat support plate 30.

Further, the fixing portions 35, which are formed to fix the seat 2, are provided at the rear end portion of the seat support plate 30. The fixing portions 35 are tongue-shaped extension portions extending outward from both ends of the rear portion 32 in the width direction, and a pair of (two) fixing portions 35 is provided at positions separated from each other as illustrated in FIG. 3. Furthermore, the corresponding portion 2e to be fixed of the two portions 2e to be fixed, which are provided at the rear end portion of the bottom plate 2b, is fixed to each of the fixing portions 35.

In more detail, as illustrated in FIG. 6, the portions 2e to be fixed are placed on the end faces (end faces facing the rear side) of the fixing portions 35, and the portions 2e to be fixed are fixed to the fixing portions 35 by fasteners, such as screws. In this embodiment, the portions 2e to be fixed are fixed to the respective fixing portions 35 (corresponding fixing portions 35) through rubber mounts R. The rubber mounts R correspond to elastic members, and are used to suppress the transmission of vibration to the seat 2 from the vehicle body 3 of the motorcycle 1.

The above-mentioned fixing structure is described in detail with reference to FIG. 6. An annular rubber mount R is fitted to a screw hole formed in each of the portions 2e to be fixed. Then, when the portion 2e to be fixed is fixed to the fixing portion 35, a through-hole formed at the central portion of the rubber mount R and the screw hole formed in the fixing portion 35 are made to communicate with each other and a screw is inserted into both the holes. Accordingly, the portion 2e to be fixed is fixed to the fixing portion 35. Then, all of the portions 2e to be fixed are fixed to the fixing portions 35, so that the seat 2 is fixed to the seat support plate 30.

As described above, in this embodiment, the portions 2e to be fixed are fixed to the fixing portions 35 in a state in which the rubber mounts R are interposed between the portions 2e to be fixed of the seat 2 and the fixing portions 35 of the seat support plate 30. Accordingly, the transmission of vibration to the seat 2 from the vehicle body 3 can be suppressed during the travel of the motorcycle 1, so that ride quality is improved.

A mechanism or a structure for fixing (mounting) the seat 2 to the seat support plate 30 is not limited to the above-mentioned mechanism or structure. Any mechanism or any structure other than the above-mentioned mechanism or structure may be used and configured to suitably fix the seat 2 relative to the seat support plate 30. Further, the numbers and the positions of the engagement portions and the fixing portions, which are formed at the seat support plate 30 to fix the seat 2, may be arbitrarily determined without being particularly limited.

The rotary links 40 are formed of plate-shaped members that are formed in predetermined shapes, and rotate integrally with the seat support plate 30 when the position of the seat 2 is adjusted. The structure of the rotary links 40 is described in detail with reference to FIG. 3. The rotary links 40 include front links 41 that are positioned on the front side and rear links 42 that are positioned on the rear side. A pair of (two) front links 41 is disposed with a gap therebetween in the width direction, and a pair of (two) rear links 42 is disposed with a gap therebetween in the width direction.

Further, the front and rear links 41 and 42 are rotatably mounted on the link mounting portions 34 of the seat support plate 30 and the link support plate 50. Specifically, the pair of front links 41 is formed of metal plate pieces, which extend in an oval shape in side view, and is connected to each other by a front connecting pipe 43 disposed between the front links 41. For example, a circular hole into which the front connecting pipe 43 is inserted is formed at an upper end portion (one end portion in an extending direction) of each front link 41, and an annular bushing is fitted to an edge portion of the circular hole. Further, end portions of the front connecting pipe 43 are fitted to through-holes of the bushings, so that the front links 41 are connected to each other by the front connecting pipe 43.

Further, the end portions of the front connecting pipe 43 protrude to the outside of the front links 41 through the front links 41. A circular hole is formed at a front end portion of each link mounting portion 34, and portions, which protrude to the outside of the front links 41, of the end portions of the front connecting pipe 43 are inserted into the circular holes. Furthermore, the ends of the pipe are flanged. Accordingly, each of the pair of front links 41 is mounted on the link mounting portion 34 through the front connecting pipe 43. Further, the front connecting pipe 43 is assembled with the link mounting portions 34 to be rotatable relative to the link mounting portions 34. Accordingly, the upper end portions of the respective front links 41 are supported by the link mounting portions 34 to be rotatable integrally with the seat support plate 30.

Further, a lower end portion of each front link 41 (an end portion opposite to the end portion of each front link 41 supported by the link mounting portion 34) is supported on a side wall of the link support plate 50 to be rotatable relative to the side wall thereof. Specifically, a circular hole is formed at the lower end portion of each front link 41, and an annular bushing is fitted to an edge portion of the circular hole. Then, a pivot pin P is fitted to a through-hole of each bushing. Furthermore, the pivot pin P, which is fitted to the through-hole of each bushing, is fixed to the side wall of the link support plate 50. The link support plate 50 is a member that is formed of a metal plate formed substantially in a U shape in front view, and includes a bottom wall and a pair of side walls that stands up from the bottom wall.

As described above, the lower end portions of the front links 41 are supported on the side walls of the link support plate 50 through the pivot pins P. Further, the pivot pins P can slide on the inner peripheral surfaces of the bushings mounted on the lower end portions of the front links 41. In other words, each front link 41 is rotatable about the pivot pin P as a rotating shaft.

The pair of rear links 42 is rotatably mounted on the link mounting portions 34 of the seat support plate 30 and the link support plate 50 by the same structure as the above-mentioned support structure. Specifically, the pair of rear links 42 is connected to each other by a rear connecting pipe 44 disposed therebetween. Further, end portions of the rear connecting pipe 44 protrude to the outside of the rear links 42 through the rear links 42. A circular hole is formed at a rear end portion of each link mounting portion 34, and portions, which protrude to the outside of the rear links 42, of the end portions of the rear connecting pipe 44 are inserted into the circular holes. Furthermore, the ends of the pipe are flanged. Accordingly, each of the pair of rear links 42 is mounted on the link mounting portion 34 through the rear connecting pipe 44.

Further, the rear connecting pipe 44 is assembled with the link mounting portions 34 to be rotatable relative to the link mounting portions 34. Accordingly, the upper end portions of the respective rear links 42 are supported by the link mounting portions 34 to be rotatable integrally with the seat support plate 30.

Further, a lower end portion of each rear link 42 (for example, an end portion opposite to the end portion of each rear link 42 supported by the link mounting portion 34) is supported on the side wall of the link support plate 50 to be rotatable relative to the side wall thereof. Specifically, a circular hole is formed at the lower end portion of each rear link 42, and an annular bushing is fitted to an edge portion of the circular hole. A pivot pin P is fitted to a through-hole of each bushing. Furthermore, the pivot pin P, which is fitted to the through-hole of each bushing, is fixed to the side wall of the link support plate 50.

As described above, the lower end portions of the rear links 42 are supported on the side walls of the link support plate 50 through the pivot pins P. Further, the pivot pins P can slide on the inner peripheral surfaces of the bushings mounted on the lower end portions of the rear links 42. In other words, each rear link 42 is rotatable about the pivot pin P as a rotating shaft.

The front and rear links 41 and 42 having the above-mentioned structure simultaneously rotate about rotation axes along the width direction. In this case, the respective rotary links 40 rotate to turn the seat support plate 30. As a result, the seat support plate 30 and the seat 2, which is supported by the seat support plate 30, rotate in the same direction as the rotation direction of the rotary links 40. Accordingly, the position of the seat (the height of the seat) is adjusted.

The front and rear links 41 and 42 are mounted on the link mounting portions 34 of the seat support plate 30 as described above. The link mounting portions 34 are disposed at the same position (on both sides of the front portion 31) as the front portion 31. Further, the front portion 31 is positioned directly under the occupant's buttocks in a state in which the occupant is seated in the seat 2. In this structure, when the position of the seat is adjusted, the front portion 31 on which the occupant's buttocks are placed is moved while interlocking with the rotation operation of the rotary links 40. Accordingly, the position of the seat is more efficiently (smoothly) adjusted.

The link support plate 50 is to support the lower end portions of the rotary links 40 so that the rotary links 40 are rotatable as described above. The link support plate 50 is disposed at a position under the seat support plate 30, for example, at a position under the front portion 31.

The base plate 52 is a base that is provided to fix the device 20 to a predetermined position (seat mounting position) on the vehicle body 3, and is positioned on the lowest side in the device 20. A metal plate, which is cut into a predetermined shape, is bent to have the shape illustrated in FIG. 3, so that the base plate 52 is formed. Further, a plurality of protruding portions, which protrude in the shape of a tongue or a rectangular shape, are provided at end portions of the base plate 52 in the width direction. The respective protruding portions are disposed to face a predetermined portion (specifically, a portion of the vehicle body 3 provided to originally mount the seat 2 thereon) of the vehicle body 3. Furthermore, a screw hole is formed at each protruding portion, a screw is inserted into each screw hole, and a tip portion of each screw is fastened to the vehicle body 3.

Accordingly, the entire device 20 including the base plate 52 is fixed to the vehicle body 3. The motor device 60 is a device that is driven to rotate the rotary links 40. The motor device 60 is supported on the link support plate 50 through two support rods (in detail, a front support rod 63 and a rear support rod 64). Specifically, the motor device 60 is fixed to one end of both ends of the front support rod 63, and the other end of the front support rod 63 is fixed to the side wall (one of the pair of side walls) of the link support plate 50 by bolts. Further, one end of both ends of the rear support rod 64 is fixed to the side wall (a side wall opposite to the side wall to which the front support rod 63 is fixed) of the link support plate 50 by bolts, and the motor device 60 is fixed to the other end of the rear support rod 64. A rod fixing hole 50a, to which the support rod is fixed, is formed at the side walls of the link support plate 50 as illustrated in FIG. 3.

Furthermore, as illustrated in FIG. 3, the motor device 60 includes a motor main body 61 and a transfer mechanism 62 that transfers the rotational energy of the motor main body 61. The transfer mechanism 62 includes a gear train (not illustrated) that rotates with the rotation of the motor main body 61. A gear, which is provided in the final stage of the gear train, forms a pinion gear and meshes with a sector gear. The sector gear is provided on one rear link of the pair of rear links 42, for example, is formed integrally with the rear link 42.

Further, when the motor main body 61 is rotated, a position where the pinion gear and the sector gear mesh with each other is changed. Accordingly, the rear link 42 is rotated and the other rotary links (that is, the rear link 42 making a pair with the rear links 42 provided with the sector gear, and the two front links 41) are rotated in the same direction to follow the rear link 42.

Operation Example of Seat Device 10

Next, an operation example of the seat device 10 having been described above is described. When the motor main body 61 of the motor device 60 is rotated in the seat device 10, the rotational energy of the motor main body 61 is transferred to one rear link 42 by the transfer mechanism 62. Accordingly, the four rotary links 40 (that is, the two front links 41 and the two rear links 42) rotate integrally with the seat support plate 30. As a result, the seat 2 supported by the seat support plate 30 is moved in the height direction, so that the position of the seat (the height of the seat) is changed.

Figure 8:
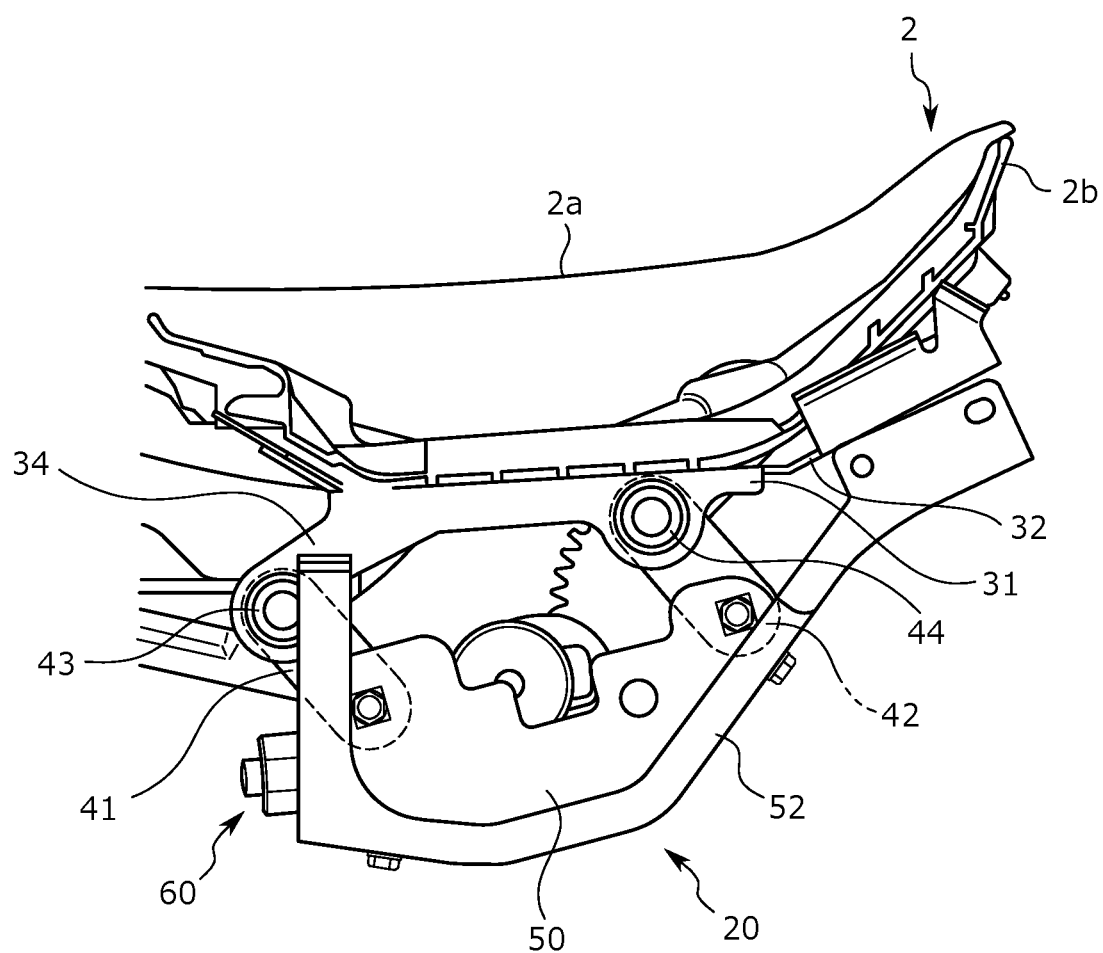
FIG. 8 is a partial side view illustrating the state of the position adjusting device when the position of the seat is a second position, according to an embodiment.
Figure 9:
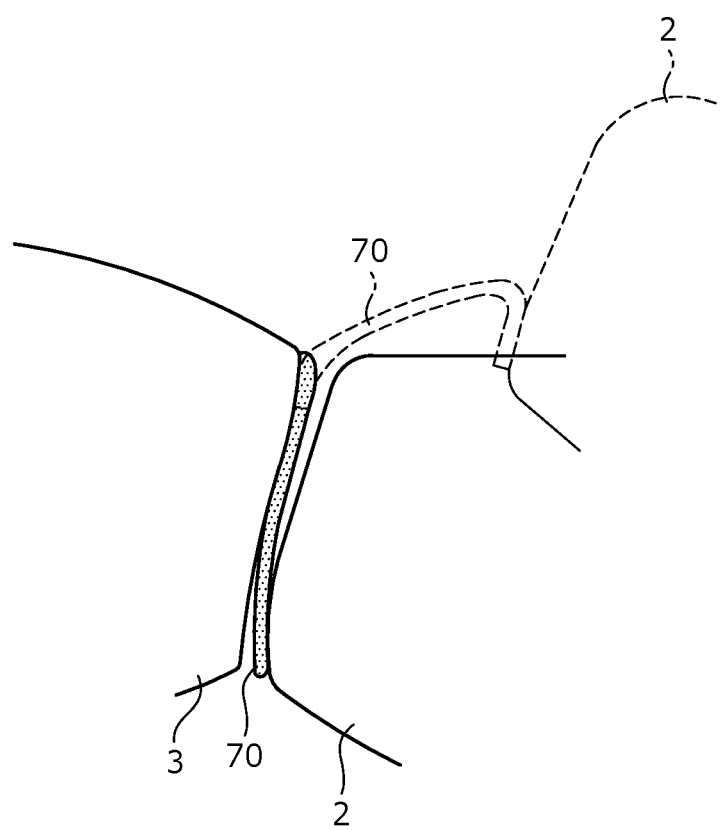
FIG. 9 is a schematic diagram illustrating a gap-closing material that is provided between a front end of the seat and the vehicle body, according to an embodiment.

The movement operation of the seat 2 is described in detail below with reference to FIGS. 7 and 8. The seat 2 is moved in a range from a position illustrated in FIG. 7 to a position illustrated in FIG. 8. In other words, the position of the seat 2 is adjusted in the range. Here, the position of the seat 2 illustrated in FIG. 7 is the lowest position (a position present on the lowest side) in the movement range of the seat 2, and is referred to as a first position hereinafter. The position of the seat 2 illustrated in FIG. 8 is the highest position (a position present on the uppermost side) in the movement range of the seat 2, and is referred to as a second position hereinafter. The second position is a position higher than the first position, that is, a position that is more distant from the ground, on which the motorcycle 1 is standing, than the first position in the height direction.

Further, when the position of the seat 2 is the first position, the state of each of the front and rear links 41 and 42 is a forward tilted state as illustrated in FIG. 7. In contrast, when the position of the seat 2 is the second position, the state of each of the front and rear links 41 and 42 is a state in which a forward tilt angle (the degree of tilt) is smaller than a forward tilt angle obtained when the position of the seat 2 is the first position as illustrated in FIG. 8. That is, when the motor main body 61 is rotated in a state in which the position of the seat 2 is the first position, each rotary link 40, which is in the forward tilted state at that point of time, starts to be rotated backward. Then, as the position of the seat 2 is changed to the second position from the first position, the forward tilt angle of each rotary link 40 is gradually reduced. For example, since the state of each rotary link 40 is gradually changed so that the forward tilt angle is gradually reduced, the position of the seat 2 is changed to the second position from the first position.

As described above, in this embodiment, the seat 2 is moved while interlocking with the rotation operation of the rotary links 40. As a result, the position of the seat is adjusted. That is, in this embodiment, the position of the seat can be adjusted by a relatively simple structure (so-called height-link mechanism) using the rotary links 40.

Further, when the seat 2 is moved to the second position from the first position by the rotation operation of the rotary links 40, the seat 2 is raised obliquely backward. That is, the second position is a position higher than the first position in the height direction, and is a position present on the rear side of the first position in the front to back direction. According to this movement path, the interference between the seat 2 and the other members (specifically, a member, such as a fuel tank T, disposed around the seat 2) can be suppressed when the seat 2 is moved to the second position from the first position.

Figure 14:
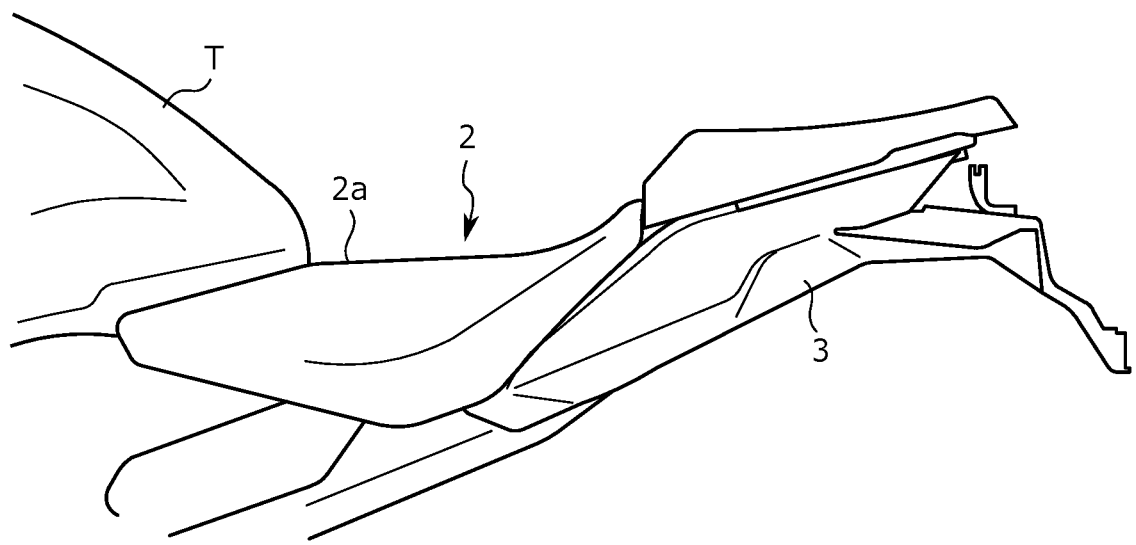
FIG. 14 is a side view diagram (first diagram) illustrating seat position adjustment according to a Modification Example, according to an embodiment.
Figure 15:
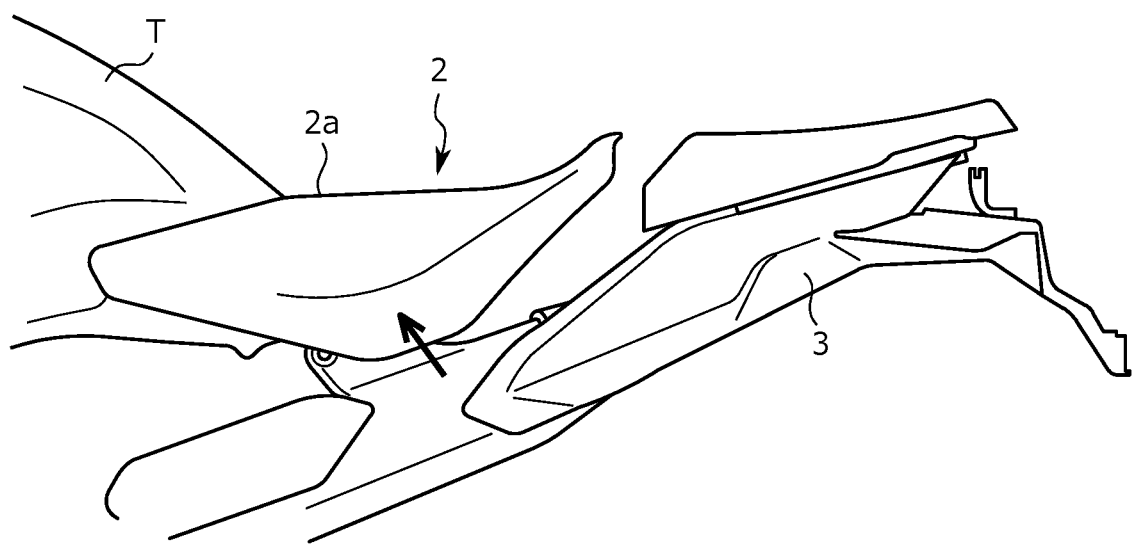
FIG. 15 is a side view diagram (second diagram) illustrating the seat position adjustment according to the Modification Example, according to an embodiment.

A movement direction, in which the seat 2 is moved to the second position from the first position, may be other directions without being limited to the above-mentioned direction (that is, the direction in which the seat is raised obliquely backward). Specifically, the second position may be set to a position that is higher than the first position in the height direction and is present on the front side of the first position in the front to back direction. In such a structure (hereinafter, a Modification Example), the seat 2 is raised obliquely forward to the second position from the first position by the rotation operation of the rotary links 40 (specifically, the change of the state of each rotary link 40 to a forward tilted state from a backward tilted state) as illustrated in FIGS. 14 and 15. In this case, the seat 2 is moved along the fuel tank T that is disposed obliquely above the seat 2. According to this structure, since a space between the fuel tank T and the seat 2 can be narrowed, the appearance of the seat can be improved. FIGS. 14 and 15 are diagrams illustrating seat position adjustment according to the Modification Example, where FIG. 14 is a diagram illustrating seat position adjustment when the seat 2 is positioned at the first position, and FIG. 15 is a diagram illustrating seat position adjustment when the seat 2 is positioned at the second position.

Figure 16:
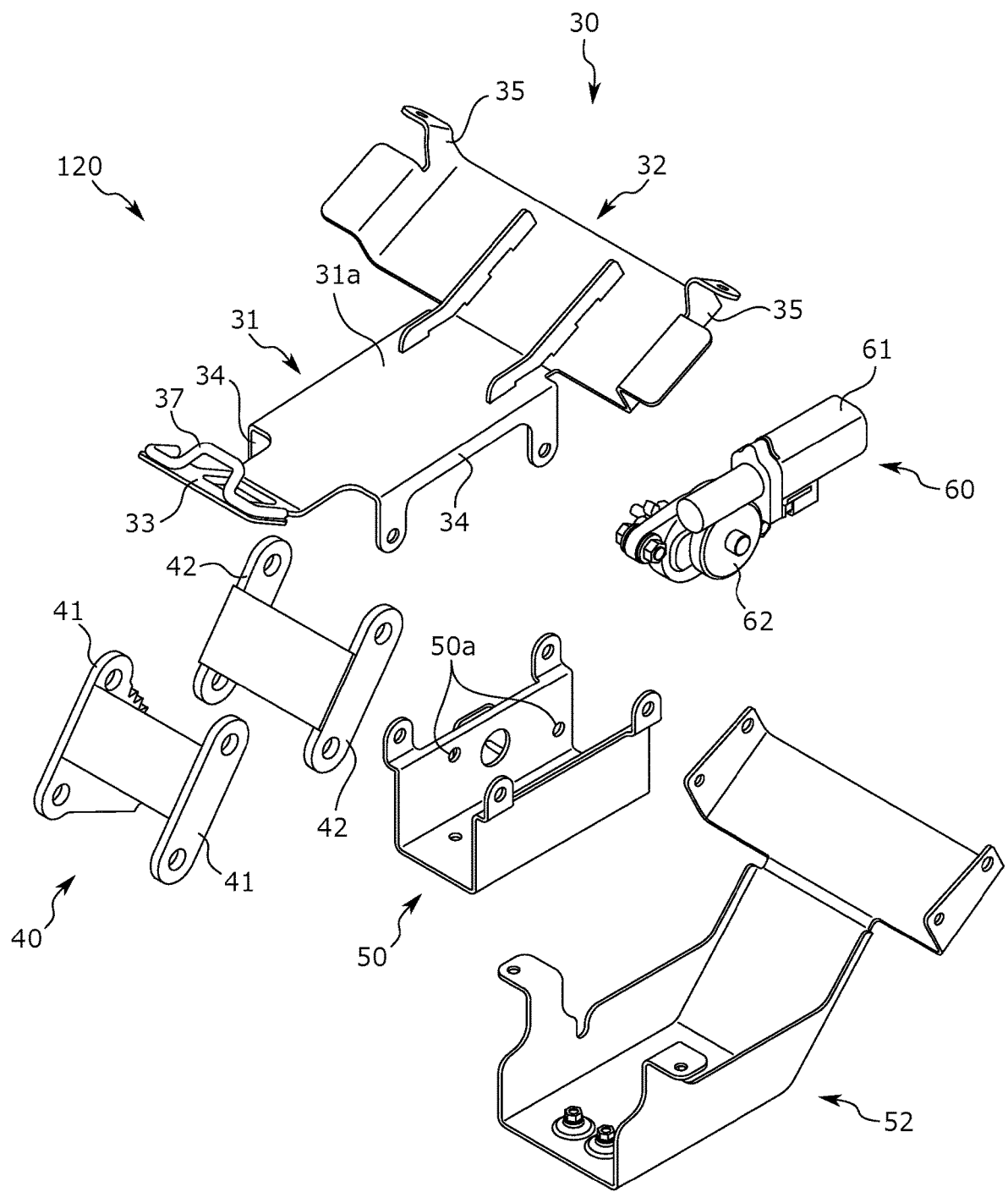
FIG. 16 is an exploded view of a position adjusting device according to the Modification Example, according to an embodiment.
Figure 17:
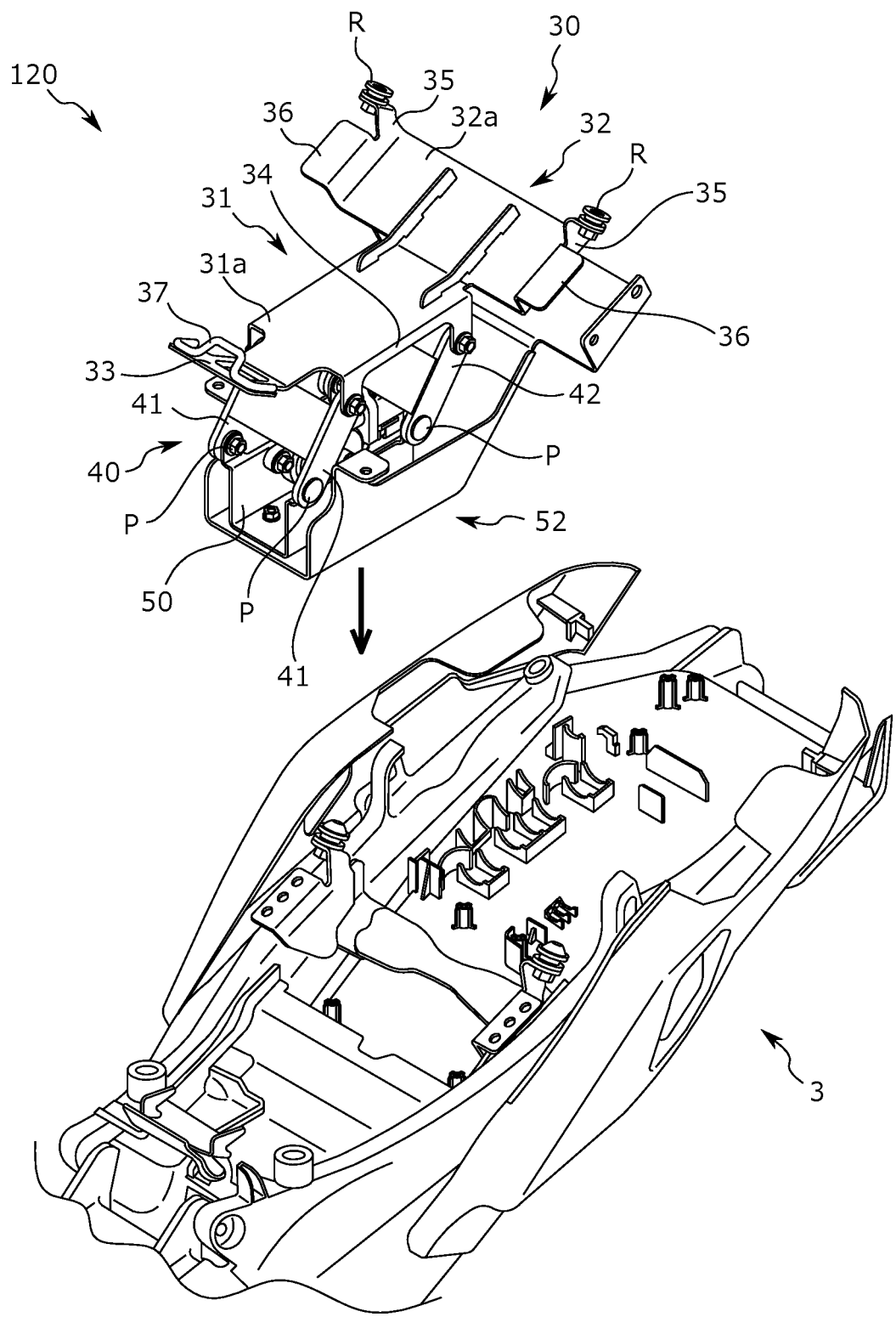
FIG. 17 is a perspective diagram illustrating a structure for mounting the position adjusting device according to the Modification Example on a vehicle body, according to an embodiment.

When the seat 2 is moved to the second position from the first position in the movement direction, a device (hereinafter, a device 120 according to the Modification Example) illustrated in FIGS. 16 and 17 is used. FIG. 16 is an exploded view of the device 120 according to the Modification Example, and is a diagram corresponding to FIG. 3. FIG. 17 is a diagram illustrating a structure for mounting the device 120 according to the Modification Example on a vehicle body, and is a diagram corresponding to FIG. 4.

The shape of the device 120 according to the Modification Example is changed to some extent due to a difference in the movement direction of the seat 2, that is, for example, a sector gear is provided not on the rear link 42 but on the front link 41. However, the device 120 has a similar structure to the above-mentioned structure (a structure in which the seat 2 is raised obliquely backward to the second position from the first position). Further, each component of the device 120 according to the Modification Example also has a similar structure to the above-mentioned structure except that the rotation direction of the rotary links 40 is reversed. For this reason, the components of the device 120 according to the Modification Example illustrated in FIGS. 16 and 17 are denoted by the same reference numerals as the corresponding components of the above-mentioned structure.

When the seat 2 is moved to the second position from the first position, the seat 2 is separated from the vehicle body 3 by a distance corresponding to a displacement between the first and second positions. That is, a gap between the seat 2 and the vehicle body 3 is increased by a distance corresponding to the displacement. When the gap between the seat 2 and the vehicle body 3 is increased in this way, there is a concern that foreign matter may enter the vehicle body through the gap or appearance may deteriorate since the inside of the vehicle body 3 is seen through the gap.

In contrast, a structure, which can close the gap between the seat 2 and the vehicle body 3 when the gap is increased, is employed in this embodiment. Specifically, in this embodiment, a gap-closing material 70 is provided between the front end of the seat 2 and a member (for example, the fuel tank) that faces the front end of the seat 2. The gap-closing material 70 is a cloth having elasticity, and is fixed to both the front end of the seat 2 and the member facing the front end of the seat 2.

Further, the gap-closing material 70 is disposed at a position (a position illustrated in FIG. 9 by a solid line) between the front end of the seat 2 and the member, which faces the front end of the seat 2, when the seat 2 is positioned at the first position. Then, when the seat 2 is moved to the second position from the first position, a gap between the front end of the seat 2 and the member facing the front end of the seat 2 is increased in the front to back direction. In this case, the gap-closing material 70 having elasticity is stretched in the front to back direction and closes the gap as illustrated by a broken line of FIG. 9. Accordingly, since the increased gap is covered even though the gap is increased in the front to back direction, trouble caused by the gap can be avoided.

Figure 10:
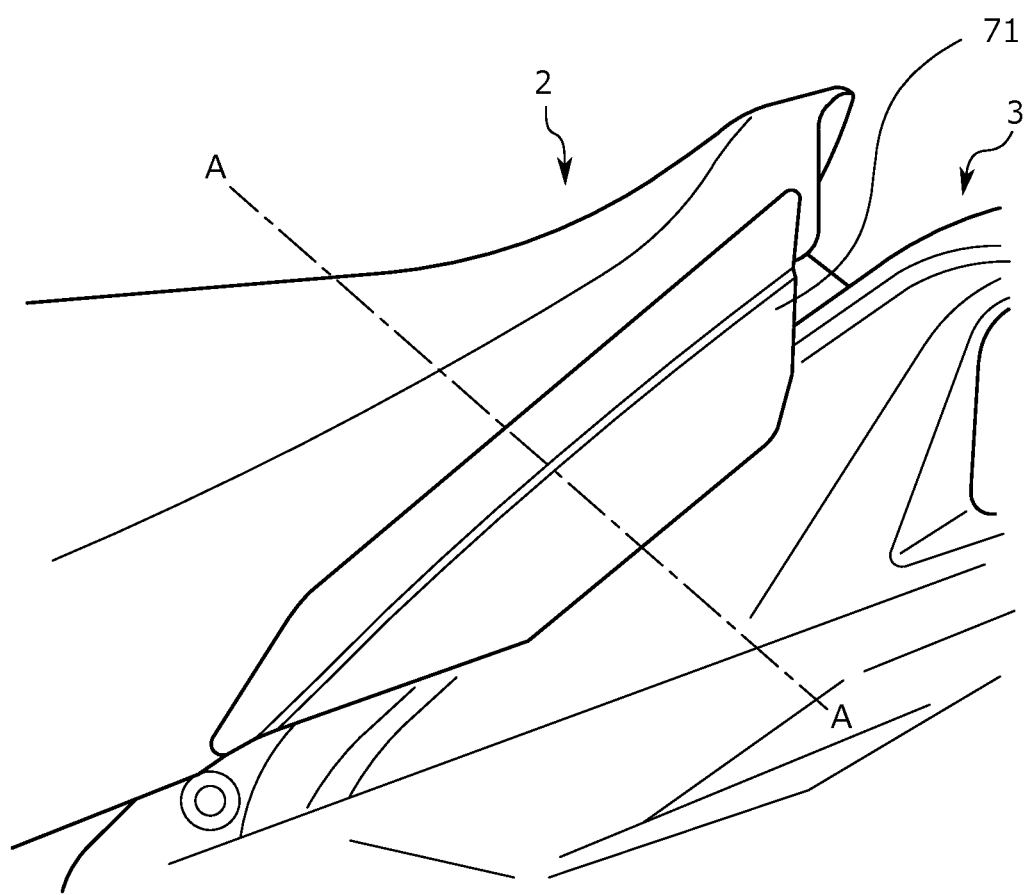
FIG. 10 is a partial side view illustrating a cover plate that is provided on a side portion of the seat, according to an embodiment.
Figure 11:
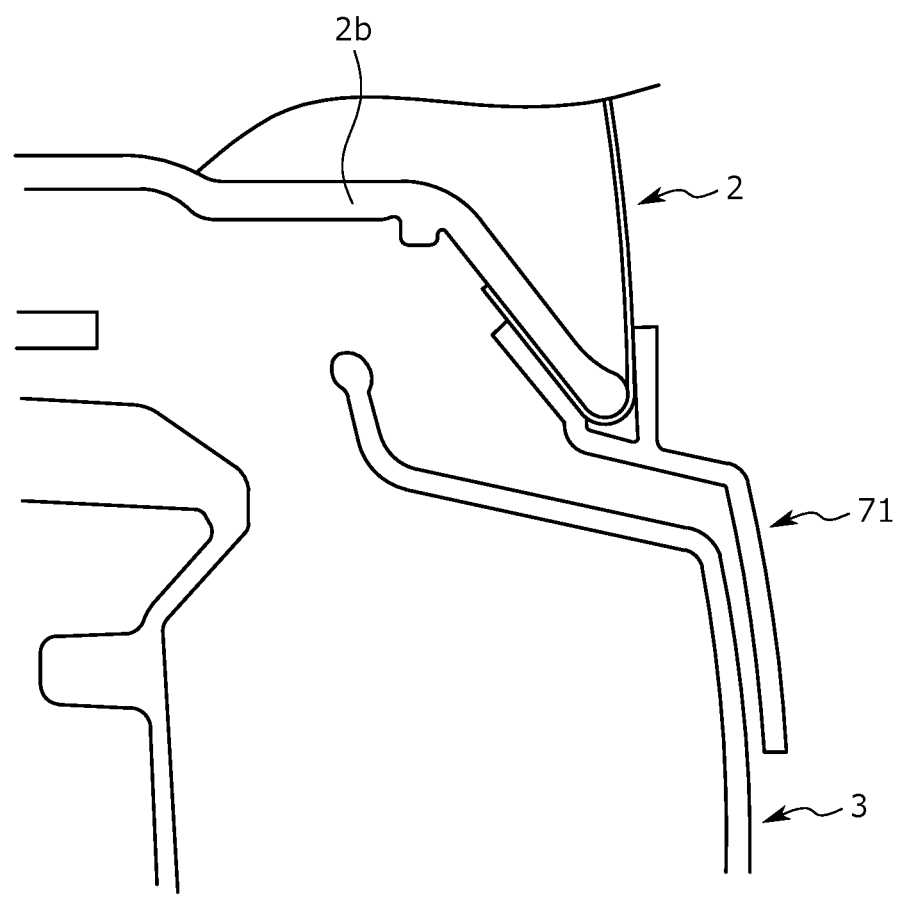
FIG. 11 is a diagram illustrating a cross-section taken along line A-A of FIG. 10, according to an embodiment.

Furthermore, in this embodiment, cover plates 71 are mounted on side ends (end faces in the width direction) of the rear end portion of the seat 2 as illustrated in FIG. 10. The cover plates 71 cover the gap between the rear end portion of the seat 2 and a member (for example, a cowl), which is positioned directly under the rear end portion of the seat 2, in the height direction, and are moved integrally with the seat 2 when the seat 2 is moved. Further, the cover plates 71 are disposed so that the lower end of each cover plate 71 is positioned slightly below the lower end of the rear end portion of the seat 2 in the height direction as illustrated in FIG. 11. Furthermore, when the seat 2 is positioned at the first position, each cover plate 71 is disposed at a position across the rear end portion of the seat 2 and a member, which is positioned directly under the rear end portion of the seat 2, in the height direction. In other words, when the seat 2 is positioned at the first position, the lower end of each cover plate 71 is positioned slightly below the upper end of the member (for example, a cowl) that is positioned directly under the rear end portion of the seat 2.

When the seat 2 is moved to the second position from the first position, the gap between the rear end portion of the seat 2 and the member, which is positioned directly under the rear end portion of the seat 2, is increased in the height direction. In this case, the cover plates 71 are raised together with the seat 2, but the lower end of each cover plate 71 is still positioned below the upper end of the member that is positioned directly under the rear end portion of the seat 2. That is, even when the seat 2 is positioned at the second position, each cover plate 71 is disposed at a position across the rear end portion of the seat 2 and a member (for example, a cowl), which is positioned directly under the rear end portion of the seat 2, in the height direction. As a result, even though the gap between the rear end portion of the seat 2 and the member, which is positioned directly under the rear end portion of the seat 2, is increased, the gap is covered from the sides with the cover plates 71. Accordingly, even though the gap is increased in the height direction, the increased gap can be covered. As a result, trouble caused by the gap can be avoided. Particularly, it is possible to prevent rainwater from entering the vehicle body through the gap in rainy weather.

Figure 18:
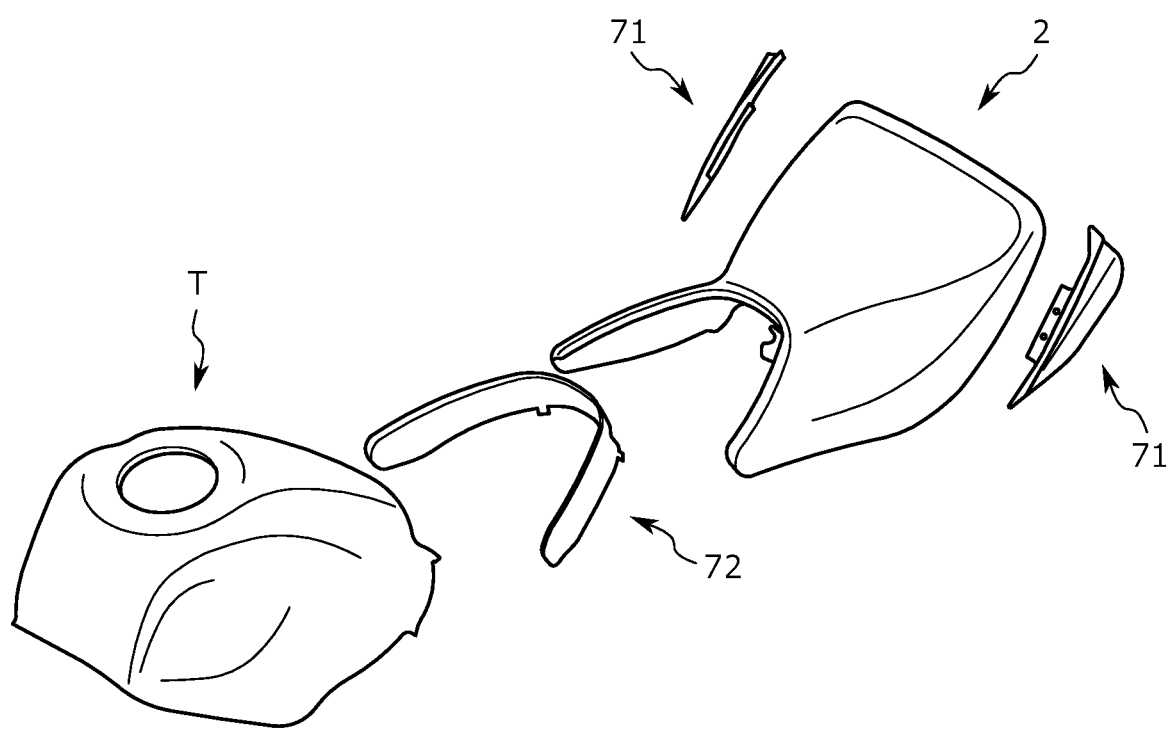
FIG. 18 is a partial, perspective diagram of cover plates for the seat, according to an embodiment.

A second cover plate (hereinafter, referred to as a front cover plate 72) illustrated in FIG. 18 may be used instead of the above-mentioned gap-closing material 70 as a member that closes a gap between the seat 2 and a component positioned on the front side of the seat 2. FIG. 18 is a diagram illustrating a structure of the seat 2 and a component (specifically, the fuel tank T) positioned around the seat 2.

The front cover plate 72 is disposed between the front end portion of the seat 2 and the fuel tank T that is disposed at a position immediately in front of the seat 2. The front cover plate 72 is bent in a substantially U shape as illustrated in FIG. 18, and is mounted on the rear end portion of the fuel tank T. In a state in which the seat 2 is positioned at the first position, the front cover plate 72 is positioned between the fuel tank T and the seat 2 in the front to back direction. In this case, the front end portion of the seat 2 is adjacent to the front cover plate 72. That is, when the seat 2 is positioned at the first position, the front end portion of the seat 2 is positioned at a position that overlaps the rear end portion of the fuel tank T in an up to down direction.

When the seat 2 is moved toward the second position from the first position, the seat 2 is raised. Accordingly, the gap between the front end portion of the seat 2 and the rear end portion of the fuel tank T is increased. Then, even when the seat 2 has reached the second position, the front end portion of the seat 2 is adjacent to the front cover plate 72 in the up to down direction. Accordingly, even in a state in which the seat 2 is positioned at the second position, the front cover plate 72 closes the gap between the seat 2 and the fuel tank T in the up to down direction. As a result, even though the gap between the front end portion of the seat 2 and the rear end portion of the fuel tank T is increased, the gap having been increased can be covered with the front cover plate 72. Accordingly, a trouble caused by the gap can be avoided. The front cover plate 72 can be applied to any of a structure in which the seat 2 is raised obliquely backward when the seat 2 is moved toward the second position from the first position and a structure in which the seat 2 is raised obliquely forward when the seat 2 is moved toward the second position from the first position.

Control Example of Seat Device 10

Next, the control example of the seat device 10 is described. When the control example of the seat device 10 is described, a control mechanism used to control the seat device 10 is described first with reference to FIGS. 12 and 13.

Figure 12:
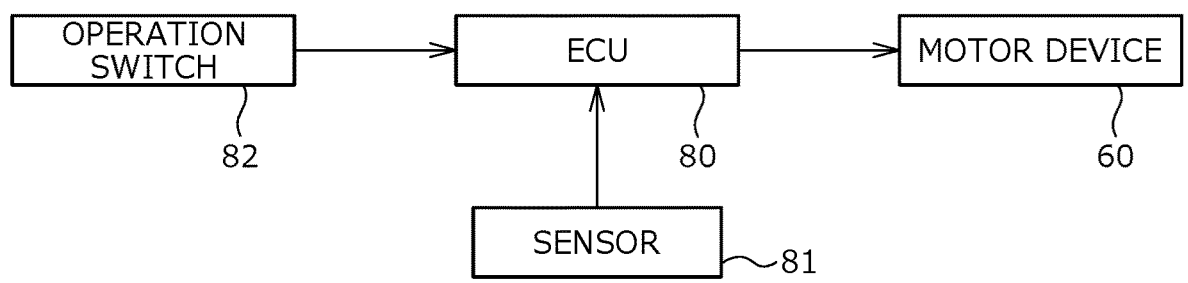
FIG. 12 is a block diagram of a control mechanism of the seat device, according to an embodiment.

As illustrated in FIG. 12, the control mechanism includes an electronic control unit (ECU) 80 as a controller. The ECU 80 is provided at a predetermined portion of the vehicle body 3, and automatically controls the position of the seat 2 in accordance with the travel speed of the motorcycle 1. More specifically, the ECU 80 controls the motor device 60 in accordance with the travel speed of the motorcycle 1. Accordingly, the rotation directions and the rotation angles of the rotary links 40 are controlled, so that the position of the seat (the height of the seat) is adjusted to a position corresponding to the travel speed of the motorcycle 1.

In more detail, the control mechanism monitors the travel speed of the motorcycle 1, and specifically, includes a sensor 81 for detecting the travel speed. When detecting the travel speed, the sensor 81 outputs a signal corresponding to a detection result thereof. When receiving the signal output from the sensor 81, the ECU 80 identifies the detection result (that is, the travel speed of the motorcycle 1) of the sensor 81 from the signal.

After identifying the travel speed, the ECU 80 compares the identified travel speed with threshold values that are stored in the ECU 80 in advance. Here, the threshold values are two kinds of threshold values. One threshold value is a threshold value that is used to determine whether or not to perform an operation (raising operation) for moving the seat 2 to the second position, and is referred to as a threshold value for travel hereinafter. The other threshold value is a threshold value that is used to determine whether or not to perform an operation (lowering operation) for moving the seat 2 to the first position, and is referred to as a threshold value for deceleration hereinafter.

The two threshold values are described by way of example. The threshold value for travel is set in the range of 70 to 90 km/h, and is set to 80 km/h in this embodiment. Further, the threshold value for deceleration is set in the range of 30 to 50 km/h, and is set to 40 km/h in this embodiment. Both the threshold value for travel and the threshold value for deceleration are not limited to the above-mentioned values, and can be set to arbitrary values.

Furthermore, in this embodiment, each threshold value can be changed ex post facto. Specifically, input means (not illustrated) is mounted on a predetermined portion of the motorcycle 1. When the input means receives an operation for changing a threshold value performed by an occupant, the threshold value is updated with a changed value by the ECU 80. If the threshold value can be changed ex post facto as described above, control conditions are set according to the user (occupant)'s preference.

Figure 13:
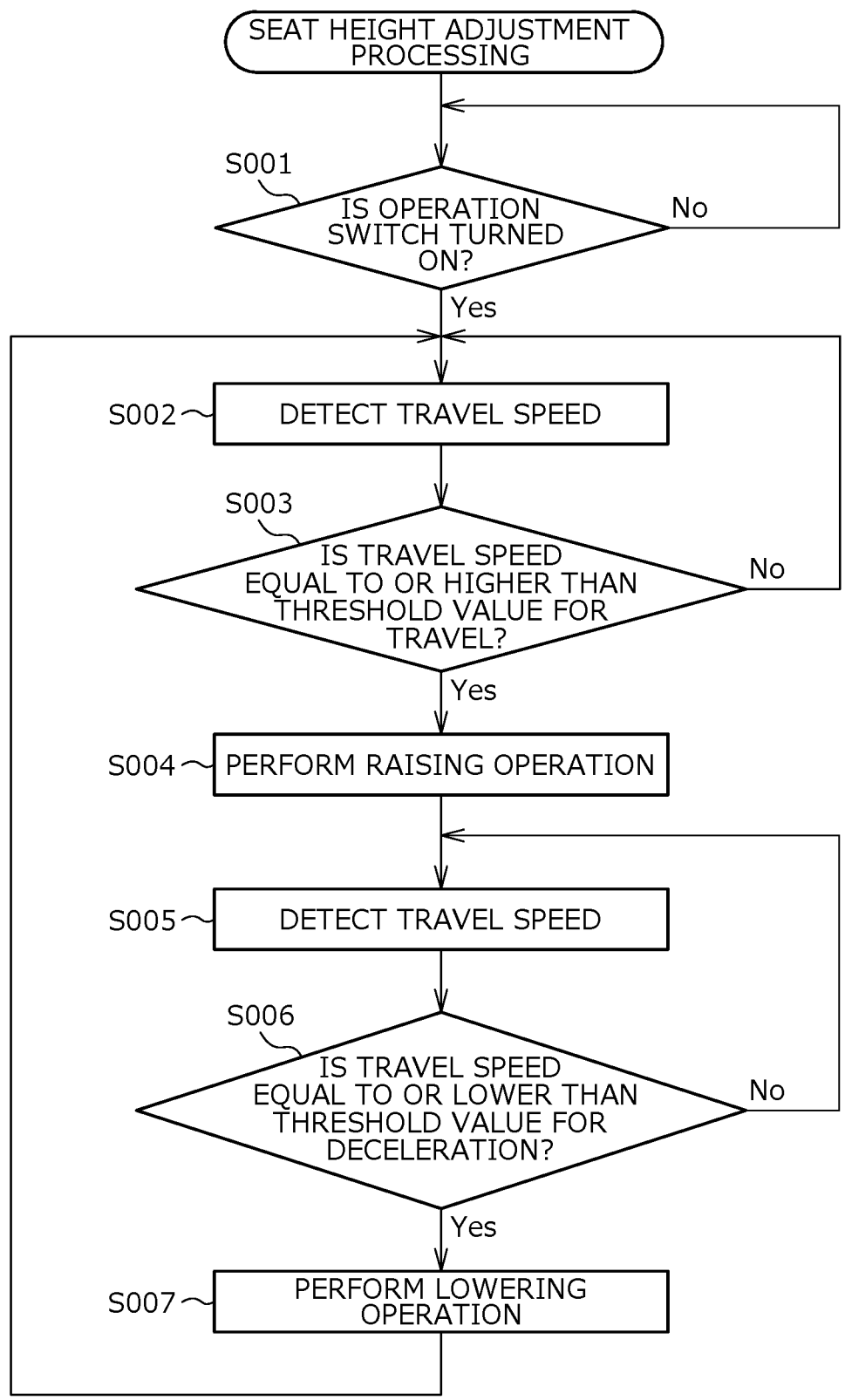
FIG. 13 is a flow diagram illustrating an example of an automatic control flow of seat position adjustment, according to an embodiment.

Further, the ECU 80 controls the motor device 60 according to a flow illustrated in FIG. 13. Specifically, an operation panel (not illustrated) is mounted on the motorcycle 1, and the operation panel has an operation switch 82 that is operable to be turned on and off by the occupant. The ECU 80 switches whether or not to perform seat position adjustment according to the turning-on/off of the operation switch 82. In this embodiment, the ECU 80 controls the motor device 60 only when the operation switch 82 is turned on. That is, seat position adjustment is performed only when the operation switch 82 is turned on, and is not performed when the operation switch 82 is turned off. Since whether or not to perform seat position adjustment can be freely switched by the operation of the operation switch 82 as described above in this embodiment, the occupant can designate whether or not to perform seat position adjustment according to one's own will.

If the operation switch 82 is turned on (Yes in S001), the ECU 80 compares a travel speed with each threshold value. Then, when a predetermined condition is satisfied, the ECU 80 controls the motor device 60 to adjust the position of the seat. In detail, when the motorcycle 1 proceeds to a travel state from a stop state, the ECU 80 identifies the travel speed of the motorcycle 1 on the basis of the signal output from the sensor 81 (S002). If the identified travel speed is equal to or higher than the threshold value for travel (Yes in S003), the ECU 80 controls the motor device 60 so that the seat 2 starts the raising operation (S004). Accordingly, the seat 2 starts to be moved to the second position from the first position. Then, the ECU 80 stops the motor device 60 when the seat 2 has reached the second position.

On the other hand, when the motorcycle 1 is decelerated, the ECU 80 identifies the travel speed of the motorcycle 1 (S005). If the identified travel speed is equal to or lower than the threshold value for deceleration (Yes in S006), the ECU 80 controls the motor device 60 so that the seat 2 starts the lowering operation (S007). Accordingly, the seat 2 is moved to the first position from the second position. In this embodiment, the ECU 80 controls the motor device 60 so that the seat 2 reaches the first position when the motorcycle 1 has been decelerated until the travel speed of the motorcycle 1 becomes a predetermined speed, for example, when the motorcycle 1 has stopped.

What is claimed is:

1. A seat device comprising:
   a saddle-riding type seat configured to support a seated occupant of a conveyance; and
   a position adjusting device that adjusts a position of the saddle-riding type seat in a height direction of the conveyance,
   wherein:
   the position adjusting device includes a plate-shaped support member that supports the saddle-riding type seat in a state in which the saddle-riding type seat is placed on the plate-shaped support member, and a rotary link that rotates with the support member when the position of the saddle-riding type seat is adjusted,
   the support member includes a front portion that is configured to be positioned directly under the occupant's buttocks when the occupant is seated in the saddle-riding type seat, and a rear portion that is positioned on a rear side of the front portion in a front to back direction of the conveyance,
   the rotary link includes a front link and a rear link that are provided at positions different from each other in the front to back direction,
   the front and rear links are mounted on the front portion,
   a width of the front portion of the support member in a width direction of the conveyance is smaller than a width of the rear portion of the support member in the width direction,
   the saddle-riding type seat includes a bottom plate forming a bottom portion,
   the support member supports the bottom plate and is supported by the front link and the rear link.

2. The seat device according to claim 1, wherein:
   the bottom plate includes a claw-shaped portion that extends in a shape of a claw and two portions to be fixed that are to be fixed to the support member,
   a front engagement portion, which is engaged with the claw-shaped portion, is provided at a front end portion of the support member, and
   two fixing portions, which are formed to fix the portions to be fixed, are provided at a rear end portion of the support member.

3. The seat device according to claim 2, wherein the portions to be fixed are fixed to the respective fixing portions through elastic members that suppress transmission of vibration to the saddle-riding type seat from a vehicle body of the conveyance.

4. The seat device according to claim 1, wherein:
the bottom plate includes a plurality of extension portions that extend to protrude, and
engagement portions, which are to be engaged with the extension portions and of which the number is the same as the number of the extension portions, are formed on the support member at positions different from each other in the front to back direction.

5. The seat device according to claim 1, wherein:
the saddle-riding type seat includes a seating surface,
a first end face, which is closer to the seating surface in the height direction, of the front portion of the support member is a flat surface, and
a second end face, which is closer to the seating surface in the height direction, of the rear portion of the support member is an inclined surface that is inclined to approach the seating surface toward the rear side.

6. The seat device according to claim 5, wherein the flat surface of the support member is a flat surface to which a normal direction is the height direction.

7. The seat device according to claim 5, wherein:
the support member includes an adjacent portion that is adjacent to the front portion on a front side of the front portion in the front to back direction, and the adjacent portion is inclined to approach the seating surface toward the front side in the front to back direction.

8. The seat device according to claim 1, wherein:
the position of the saddle-riding type seat is adjustable in a range from a first position to a second position,
the second position is a position that is more distant from a ground surface, on which the conveyance stands, than the first position in the height direction, and
the degree of tilt of each of the front and rear links is changed as the position of the saddle-riding type seat is changed to the second position from the first position.

9. The seat device according to claim 8, wherein the second position is a position present on a rear side of the first position in the front to back direction.

10. The seat device according to claim 8, wherein the second position is a position present on a front side of the first position in the front to back direction.

11. The seat device according to claim 1, wherein the position adjusting device is a device in which components of the position adjusting device including the support member and the rotary link are integrated as a unit, and is detachably mounted on a vehicle body of the conveyance.

12. The seat device according to claim 1, further comprising a motor device for rotating the rotary link, wherein:
the motor device is disposed between the front link and the rear link.

* * * * *